US011343820B2

(12) United States Patent
Saxena et al.

(10) Patent No.: US 11,343,820 B2
(45) Date of Patent: *May 24, 2022

(54) RADIO RESOURCE ALLOCATION IN A NARROWBAND COMMUNICATION SYSTEM

(71) Applicant: Telefonaktiebolaget LM Ericsson (publ), Stockholm (SE)

(72) Inventors: Vidit Saxena, Järfälla (SE); Johan Bergman, Stockholm (SE); Yufei Blankenship, Kildeer, IL (US); Xingqin Lin, Santa Clara, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/935,902

(22) Filed: Jul. 22, 2020

(65) Prior Publication Data

US 2021/0007100 A1   Jan. 7, 2021

Related U.S. Application Data

(63) Continuation of application No. 16/069,758, filed as application No. PCT/SE2017/050098 on Feb. 3, 2017, now Pat. No. 10,791,555.

(Continued)

(51) Int. Cl.
*H04W 72/04* (2009.01)
*H04L 5/00* (2006.01)
*H04W 76/27* (2018.01)

(52) U.S. Cl.
CPC ....... *H04W 72/0453* (2013.01); *H04L 5/0039* (2013.01); *H04L 5/0044* (2013.01);
(Continued)

(58) Field of Classification Search
CPC .......... H04W 72/0453; H04W 72/042; H04W 72/048; H04W 72/0406; H04W 72/12;
(Continued)

(56) References Cited

U.S. PATENT DOCUMENTS 7,983,350 B1   7/2011   Dhanoa et al.
8,131,306 B2   3/2012   Ho et al.
(Continued)

FOREIGN PATENT DOCUMENTS

RU   2374775 C2   11/2009
RU   2528020 C2   9/2014
WO   WO-2016093573 A1 *  6/2016 ............. H04L 5/005

OTHER PUBLICATIONS

Huawei, et al., "Revised Work Item: Narrowband IoT (NB-IoT)", 3GPP TSG RAN Meeting #70, Sitges, Spain, Dec. 7, 2015, pp. 1-10, RP-152284 (revision of RP-152232), 3GPP.

(Continued)

*Primary Examiner* — Un C Cho
*Assistant Examiner* — Rasha K Fayed
(74) *Attorney, Agent, or Firm* — Coats & Bennett, PLLC

(57) ABSTRACT

Methods and apparatuses of resource allocation for wireless communication are presented. In an example, a user equipment may contain radio circuitry and processing circuitry such that the user equipment is configured to obtain a set of multiple indices, where each index in the set of multiple indices corresponds to a different uplink resource allocation from a set of uplink resource allocations formed from twelve contiguous subcarriers. In an aspect, the set of uplink resource allocations includes an allocation of the twelve contiguous subcarriers, two allocations of six contiguous subcarriers, four allocations of three contiguous subcarriers, and twelve allocations of a single subcarrier. In a further aspect, the user equipment can receive an index indication (Continued)

corresponding to an index from the set of multiple indices from the base station. Also, the user equipment can transmit data to the base station using the resource allocation corresponding to the received index indication.

20 Claims, 21 Drawing Sheets

Related U.S. Application Data

(60) Provisional application No. 62/292,199, filed on Feb. 5, 2016.

(52) U.S. Cl.
CPC ....... *H04W 72/042* (2013.01); *H04W 72/048* (2013.01); *H04W 76/27* (2018.02); *H04L 5/0094* (2013.01)

(58) Field of Classification Search
CPC ........... H04W 72/1205; H04W 72/085; H04W 72/082; H04W 72/0446; H04W 72/04; H04W 72/02; H04W 76/27; H04W 28/02; H04W 28/16; H04W 84/04; H04W 84/047; H04W 16/14; H04W 52/243; H04W 52/24; H04W 24/00; H04W 88/08; H04W 48/08; H04L 5/0039; H04L 5/0044; H04L 5/0094; H04L 5/0007; H04L 5/0053; H04L 5/003; H04L 5/0035; H04L 5/0073; H04L 5/001; H04L 5/0055; H04L 5/006; H04L 5/0037; H04L 5/0023; H04L 27/2605; H04L 27/2601; H04L 27/2613; H04L 27/2627; H04L 25/0202; H04L 25/0226; H04L 25/0228; H04L 25/024; H04L 25/0204; H04L 25/0232; H04L 1/18; H04L 1/0023; H04L 1/0003; H04L 1/004; H04L 1/0029; H04L 1/0041; H04L 67/1023; H04L 67/1029; H04B 7/0413; H04B 7/15; H04B 7/02
See application file for complete search history.

(56) References Cited

U.S. PATENT DOCUMENTS

| | | | |
|---|---|---|---|
| 8,290,447 B2 | 10/2012 | Sutton et al. | |
| 8,311,564 B2 | 11/2012 | Chun et al. | |
| 8,391,383 B2 | 3/2013 | Ponnampalam et al. | |
| 8,571,132 B2 | 10/2013 | Khandekar et al. | |
| 8,665,697 B1* | 3/2014 | Venugopalan | H04J 11/005 370/210 |
| 8,761,075 B2 | 6/2014 | Kim et al. | |
| 9,204,435 B2 | 12/2015 | Lee et al. | |
| 9,571,570 B1 | 2/2017 | Mutnuru | |
| 9,661,630 B2 | 5/2017 | Arnott et al. | |
| 9,750,026 B1 | 8/2017 | Saxena et al. | |
| 2005/0147024 A1* | 7/2005 | Jung | H04B 1/713 370/203 |
| 2007/0223440 A1 | 9/2007 | Ho et al. | |
| 2008/0107192 A1* | 5/2008 | Mukkavilli | H04L 5/0048 375/260 |
| 2008/0117867 A1* | 5/2008 | Yin | H04W 72/048 370/329 |
| 2009/0088090 A1* | 4/2009 | Na | H04B 7/0617 455/101 |
| 2010/0002787 A1* | 1/2010 | Choi | H04L 5/005 375/260 |
| 2010/0110929 A1* | 5/2010 | Li | H04L 5/0032 370/254 |
| 2010/0202400 A1* | 8/2010 | Richardson | H04W 8/005 370/330 |
| 2010/0322225 A1 | 12/2010 | Kumar et al. | |
| 2012/0039406 A1* | 2/2012 | Srinivasa | H04B 7/0417 375/260 |
| 2013/0114425 A1* | 5/2013 | Sayana | H04B 7/024 370/252 |
| 2013/0301551 A1* | 11/2013 | Ghosh | H04B 7/066 370/329 |
| 2013/0322363 A1 | 12/2013 | Chen et al. | |
| 2014/0086168 A1* | 3/2014 | Bao | H04L 5/0096 370/329 |
| 2017/0230979 A1 | 8/2017 | Saxena | |
| 2017/0310439 A1* | 10/2017 | Yang | H04L 27/0006 |

OTHER PUBLICATIONS

Qualcomm Incorporated, "New Work Item: NarrowBand Iot (Nb-Iot)", 3GPP TSG RAN Meeting #69, Phoenix, USA, Sep. 14, 2015, pp. 1-8, RP-151621, 3GPP.

Mediatek Inc., "Discussion on resource allocation of NB-PUSCH", 3GPP TSG-RAN WG1 NB-IOT Ad-Hoc Meeting, Budapest, Hungary, Jan. 18, 2016, pp. 1-5, R1-160164.

Samsung, "Narroband IOT—Downlink Control/Data Channel Design", 3GPP TSG RAN WG1 Meeting #82bis, Malmo, Sweden, Oct. 5, 2015, pp. 1-7, R1-155512.

Ericsson, "NB-PUSCH Design", 3GPP TSG-RAN1#84, St Julian's, Malta, Feb. 15, 2016, pp. 1-3, R1-160271.

ZTE, "Uplink Data Channel with 15 kHz Subcarrier Spacing for NB-IoT", 3GPP TSG RAN WG1 NB-IoT Ad-Hoc Meeting, Budapest, HU, Jan. 18, 2016, pp. 1-7, R1-160053, 3GPP.

Huawei et al., "DCI for NB-IoT", 3GPP TSG RAN WG1 NB-IoT Ad-Hoc Meeting, Budapest, HU, Jan. 18, 2016, pp. 1-3, R1-160032, 3GPP.

NTT Docomo, "Design and Feature for PUSCH", 3GPP TSG RAN WG1 NB-IoT Ad-Hoc Meeting, Budapest, HU, Jan. 18, 2016, pp. 1-4, R1-160167, 3GPP.

\* cited by examiner

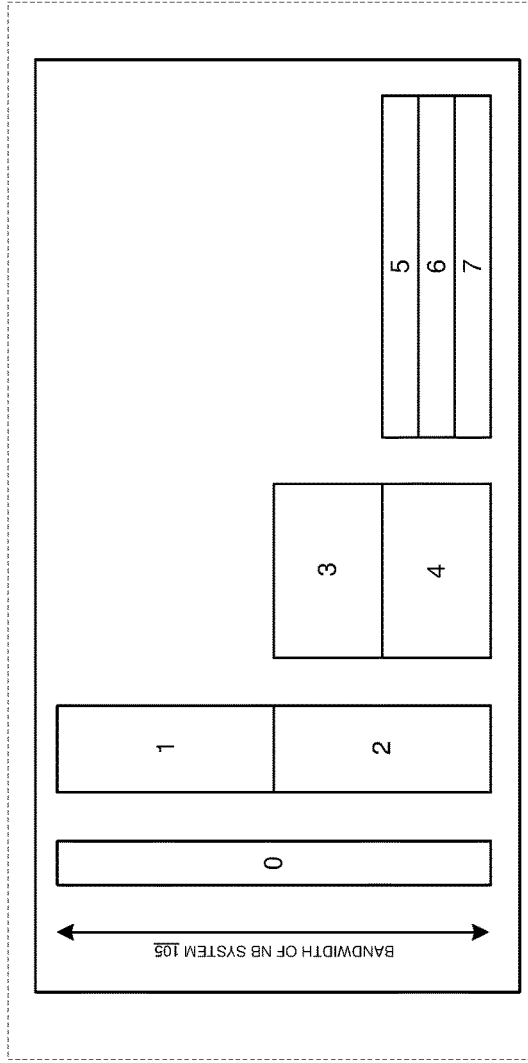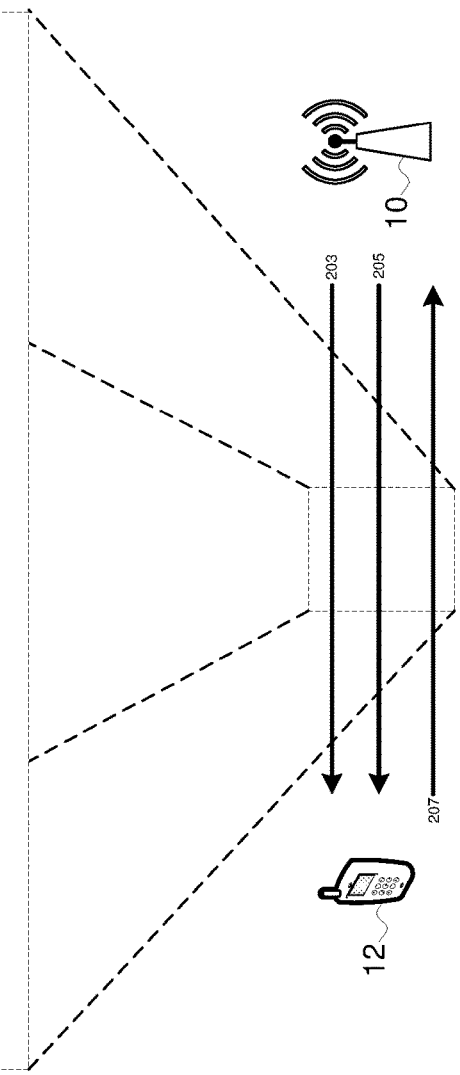
FIG. 3A

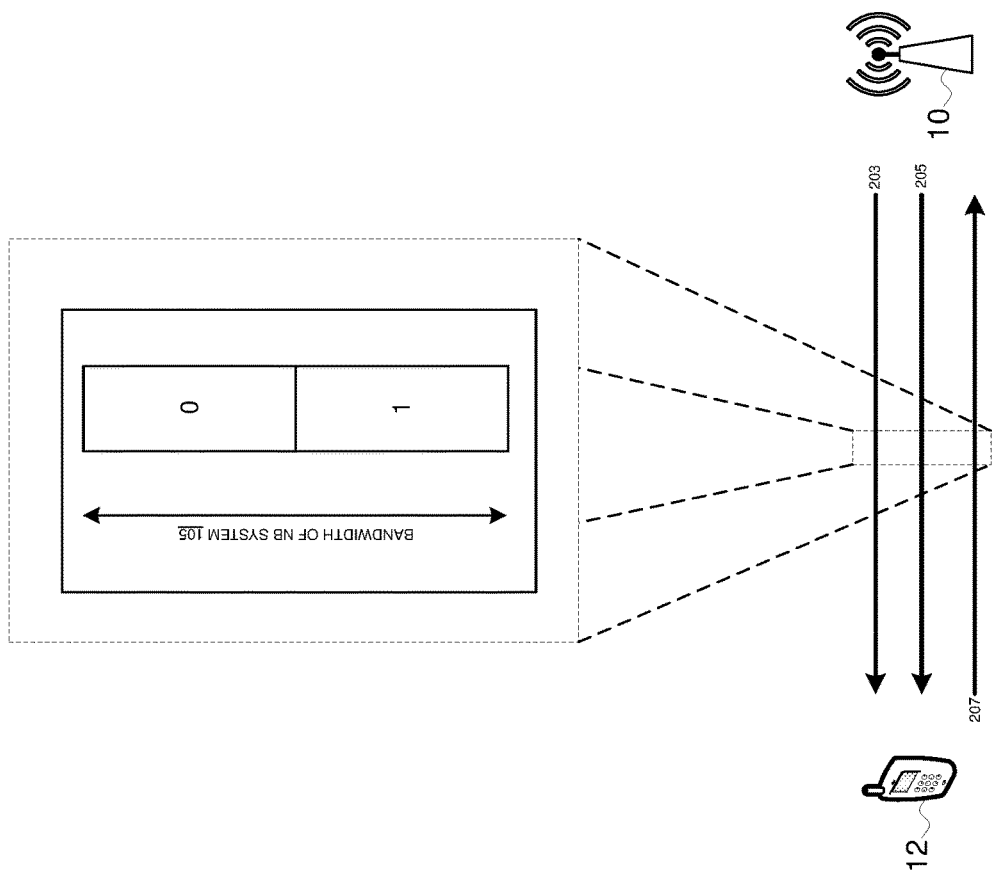

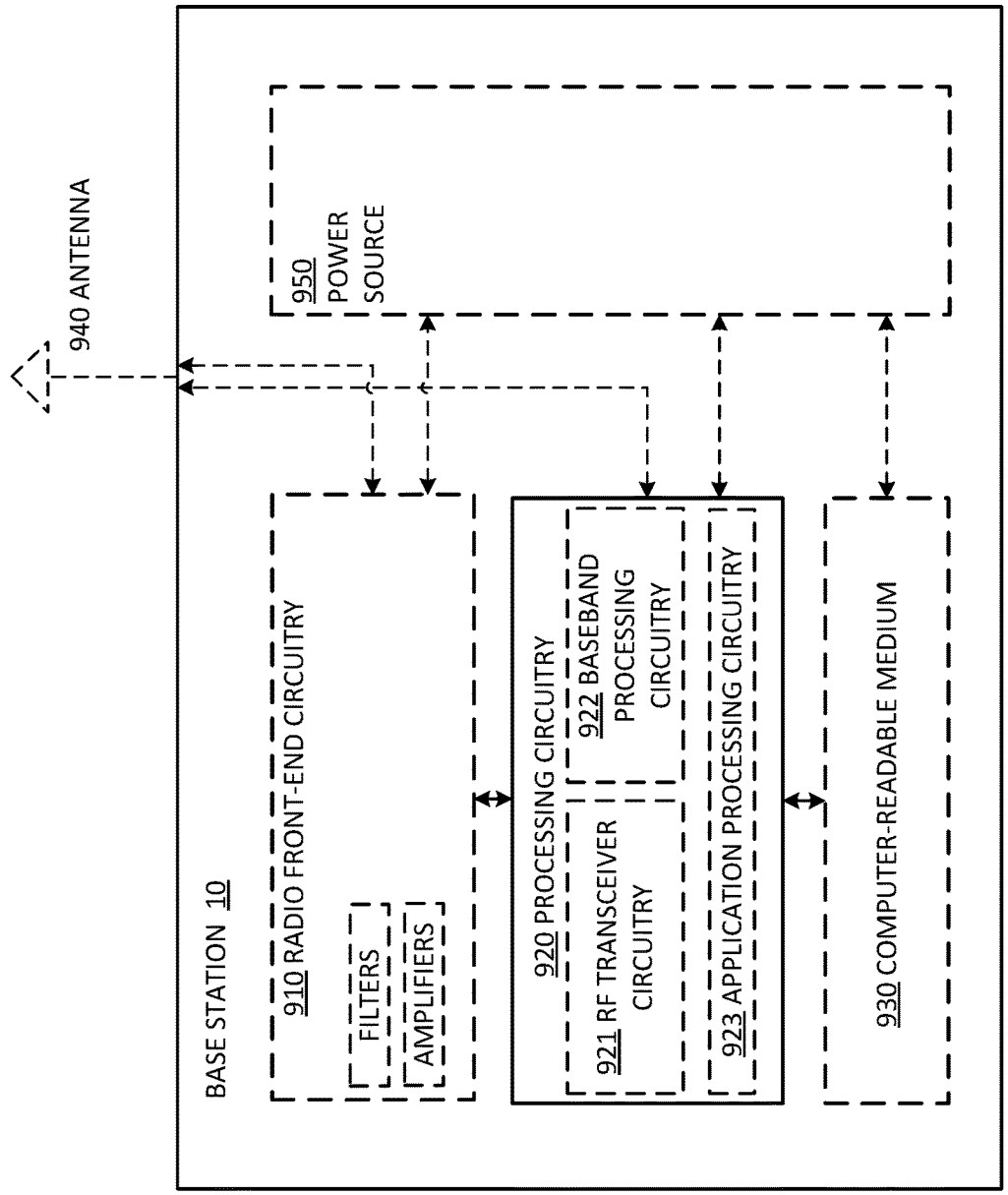

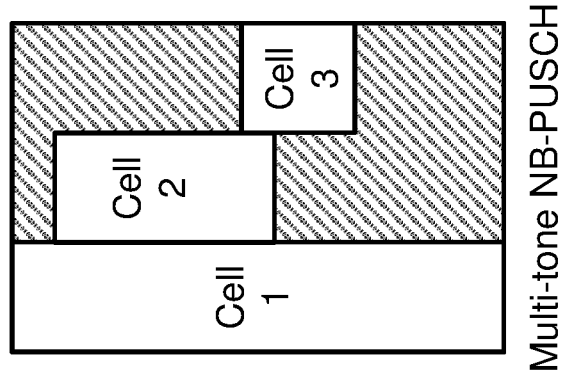
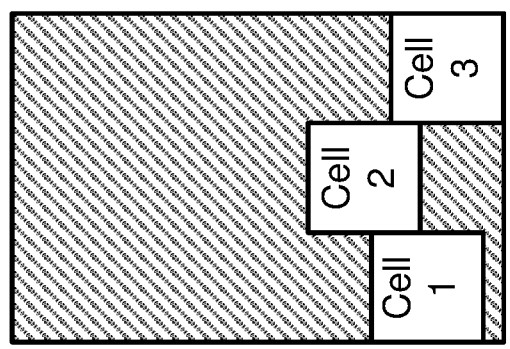
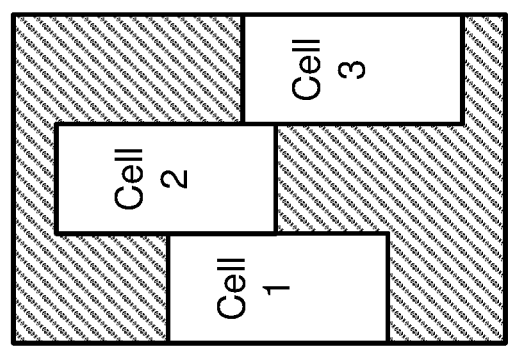
FIG. 12

RADIO RESOURCE ALLOCATION IN A NARROWBAND COMMUNICATION SYSTEM

RELATED APPLICATIONS

The present application is a continuation of U.S. patent application Ser. No. 16/069,758, which was filed on Jul. 12, 2018, which is a national stage application of PCT/SE2017/050098, filed Feb. 3, 2017, and claims benefit of U.S. Provisional Application 62/292,199, filed Feb. 5, 2016, the disclosures of each of which are incorporated herein by reference in their entirety.

TECHNICAL FIELD

The present application generally relates to a wireless communication system, and particularly relates to radio resource allocation in a narrowband wireless communication system.

BACKGROUND

Currently, the $3^{rd}$ generation partnership project (3GPP) is standardizing a feature called Narrowband Internet of Things (NB-IoT) for satisfying the requirements of Machine Type Communication (MTC) applications, while maintaining backward compatibility with the current LTE radio access technology. Minimizing overhead in communication of control information, including uplink resource grants, and limiting inter-cell interference introduced by the transmission of payload data in a NB-IoT environment proves challenging because it may be necessary for NB-IoT devices to operate in environments that exhibit very low signal to noise ratios (SNRs) while being unable to leverage existing LTE techniques for interference mitigation minimizing overhead given the limited available uplink frequency bandwidth and processing power capabilities of NB-IoT devices.

In some current wireless communication systems, a network-side scheduler is able to schedule uplink transmissions for associated NB-IoT wireless communication devices with a 1-subcarrier granularity. As a result, separate cells or base stations may freely schedule uplink transmissions over any available uplink subcarrier or groups of carriers essentially without limitation. This leads to a large number of scenarios where neighboring cells or base stations schedule respective uplink transmissions that wholly or partially overlap in frequency and time, which can result in inter-cell interference. Some wireless communication systems counter this risk of interference by implementing multiple uplink transmissions in each cell for a number of wireless communication devices. The orthogonality between overlapping transmissions might be comprised. Some wireless communication systems counter this risk of interference by implementing a DMRS sequence in each cell and a phase shift to the cell DMRS for each wireless communication device in a cell, which can maintain orthogonality between overlapping transmissions where a sufficient number of device-specific DMRS code and phase shift combinations exist to cover all of the transmitting wireless communication devices in the system. However, when the granularity of uplink resource allocations is on the single-subcarrier level and the number of wireless communication devices in the system increases, an insufficient number of combinations may exist to ensure orthogonality between any device pair, resulting in potentially high correlation between device-specific combinations and increased inter-cell interference.

Therefore, techniques are needed for reducing the potential for inter-cell interference caused by uplink transmissions in narrowband communication systems, such as NB-IoT.

SUMMARY

In an aspect of example embodiments, a set of different possible resource allocations is defined for a narrowband wireless communication system, where the possible resource allocations span a single tone or multiple tones having one of different possible multi-tone span sizes. Furthermore, according to aspects of the example embodiments, each possible multi-tone allocation is offset in frequency from any other multi-tone allocation by an integer multiple of one of the different possible multi-tone span sizes. Some embodiments herein thereby "artificially" limit the number of possible uplink allocations, e.g., relative to existing allocation techniques. As a result, the potential for multiple uplink transmissions to overlap in a particular time-frequency resource is reduced in the system. In one or more embodiments, this proves advantageous in that it reduces the potential for inter-cell interference caused by simultaneous uplink transmissions on an overlapping frequency resource.

In particular, the present disclosure describes an example user equipment for communicating with a base station in a narrowband communication system. In an example, the user equipment may contain radio circuitry and processing circuitry such that the user equipment is configured to obtain a set of multiple indices, where each index in the set of multiple indices corresponds to a different uplink resource allocation from a set of uplink resource allocations formed from twelve contiguous subcarriers. In an aspect, the set of uplink resource allocations includes an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers. Additionally, these allocations may be arranged such that the two allocations of six contiguous subcarriers do not overlap with each other and fall within a bandwidth of the twelve contiguous subcarriers, the four allocations of three contiguous subcarriers do not overlap with each other and fall within the bandwidth of the twelve contiguous subcarriers, and the twelve allocations of single subcarriers do not overlap with each other and fall within the bandwidth of the twelve contiguous subcarriers. In a further aspect, the user equipment can receive an index indication corresponding to an index from the set of multiple indices from the base station. Also, the user equipment can transmit data to the base station using the resource allocation corresponding to the received index indication. Related methods performed by such example user equipment are provided as well.

Additionally, the present disclosure describes an example base station for communicating with a user equipment in a narrowband communication system. In an example, the base station may contain radio circuitry and processing circuitry such that the base station is configured to obtain a set of multiple indices, where each index in the set of multiple indices corresponds to a different uplink resource allocation from a set of uplink resource allocations formed from twelve contiguous subcarriers. In an aspect, the set of uplink resource allocations includes an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers. Additionally, these allocations may be arranged such that the two allocations of six contiguous subcarriers do not overlap with each other and fall within a bandwidth of the twelve contiguous subcarriers, the four allocations of three contiguous subcarriers do not overlap with each other and fall within the bandwidth of the twelve contiguous subcarriers, and the twelve allocations of single subcarriers do not overlap with each other and fall within the bandwidth of the twelve contiguous subcarriers. In a further aspect, the base station can transmit an index indication corresponding to an index from the set of multiple indices to the user equipment. Also, the base station can transmit data to the user equipment using the resource allocation corresponding to the transmitted index indication. Related methods performed by such example base stations are provided as well.

BRIEF DESCRIPTION OF THE DRAWINGS

FIG. 3A is a block diagram of a wireless communication system implementing aspects of uplink resource allocation according to one or more embodiments.

FIG. 3B is a block diagram of a wireless communication system implementing aspects of uplink resource allocation according to one or more embodiments.

FIG. 9 is a block diagram of a base station according to one or more embodiments.

FIG. 12 is a diagram illustrating a further example resource allocation for multi-tone uplink transmission on a shared uplink channel according to one or more embodiments.

DETAILED DESCRIPTION

Figure 1:
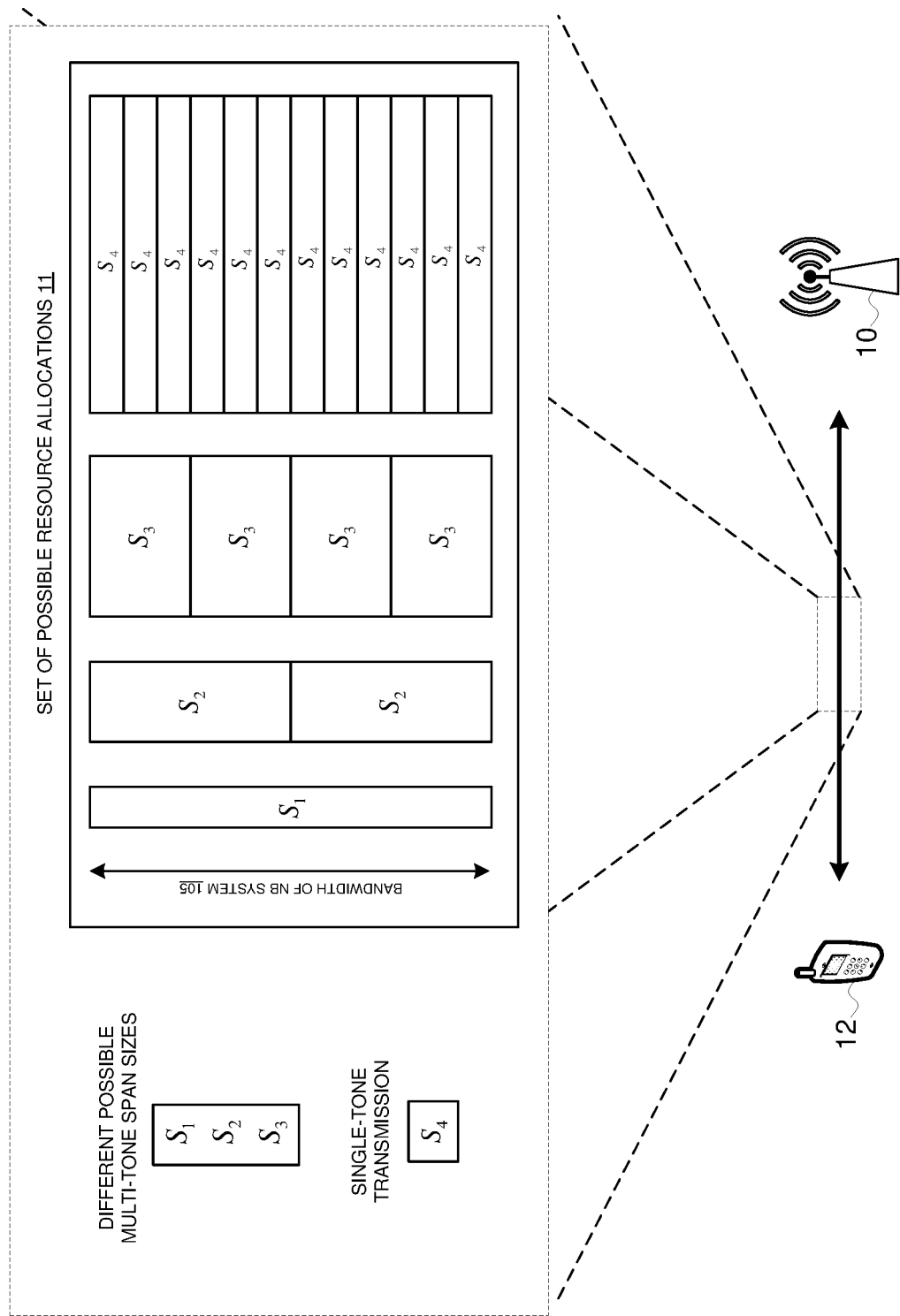
FIG. 1 is a block diagram of a wireless communication system implementing aspects of uplink resource allocation according to one or more embodiments.

FIG. 1 illustrates a first radio node and a second radio node in a wireless communication system (e.g., a narrowband Internet of Things, NB-IoT, system) according to one or more embodiments. For purposes of the present disclosure, the term "radio node" may correspond to any device of an narrowband communication system, including a radio network node or a wireless communication device. In an aspect, one of the first radio node or the second radio node may be a radio network node 10 and the other radio node may be a wireless communication device 12. Though not limiting, for purposes of FIG. 1, the first radio node corresponds to a radio network node 10 and the second radio node corresponds to the wireless communication device 12.

In an aspect of some example embodiments, one or both of the radio network node 10 or the wireless communication device 12 are configured to determine a resource allocation for wireless communication between the nodes 10, 12. The determined resource allocation is included in a set of possible resource allocations 11 for the system.

As illustrated in FIG. 1, the set of possible resource allocations 11 have different frequency span sizes and frequency positions within the bandwidth 105 of the system. Each possible resource allocation spans one or more contiguous tones in frequency. For example, as shown, the set of possible resource allocations contains allocations of a single tone or multiple tones positioned in discrete locations in the bandwidth 105 of the system. In the example embodiment of FIG. 1, three different non-limiting multi-tone span sizes are possible: $S_1$, $S_2$, and $S_3$.

In some implementations, each of the different possible multi-tone span sizes are limited to integer factors of a largest one of the different possible multi-tone span sizes. For instance, consider an example where the bandwidth 105 of the system comprises twelve (12) subcarriers or tones. In such a case, $S_1$ is equal to 12 tones and is the largest one of the different possible multi-tone span sizes. As such, the factors of the largest one of the different possibly multi-tone spans in this example are the plural factors or 12—namely, 2, 3, 4, and 6. Furthermore, consider that in the same case that uplink transmission using to 3- and 6-tone contiguous allocations are allowable but uplink transmission using 2- and 4-tone contiguous allocations are not allowable. Under these circumstances, multi-tone allocations having spans of 2 and 4 are not permitted, and as such (where permitted for uplink transmission) 3- and 6-tone contiguous allocations may be utilized for uplink resource allocation, and $S_2$ and $S_3$ may therefore correspond to 6 and 3, respectively.

In a further aspect, each of the possible resource allocations 11 labeled as having a multi-tone span size (i.e., any possible allocation labeled as $S_1$, $S_2$, and $S_3$) and the individual single-tone resource allocations (any possible resource allocation labeled $S_4$) may be allocated individually and apart from any other resource allocation having a same span size. In other words, in the example embodiment of FIG. 1, both allocations labeled $S_2$, are individually allocatable apart from the one another, the four allocations labeled $S_3$ are allocatable apart from the one another, and the twelve allocations labeled $S_4$ are individually allocatable apart from the one another. This is not to say, however, that multiple contiguous possible resource allocations having a same span are foreclosed from being allocated together in some examples.

Furthermore, as illustrated in the set of possible resource allocations 11, each possible allocation of each multi-tone span size has a number of discrete possible frequency positions within the bandwidth 105 of the narrowband communication system. These possible frequency positions for each multi-tone span size are each offset in frequency from any other possible resource allocation spanning multiple tones by an integer multiple of one of the different possible multi-tone span sizes. In the example of FIG. 1, for instance, any possible (or "permissible," or "allowable") position for any multi- or single-tone resource allocation is one of a set of positions resulting from evenly partitioning the bandwidth 105 of the system into allocations containing the number of tones of the subject multi- or single-tone resource allocation.

After the resource allocation has been determined, the first radio node may communicate wirelessly with the second radio node over the determined resource allocation. This wireless communication may correspond to the wireless communication device 12 transmitting one or more signals to the network node 10 over the determined resource allocation and/or the network node 10 receiving one or more signals transmitted by the wireless communication device 12 over the determined resource allocation.

Some embodiments herein thereby "artificially" limit the number of possible uplink allocations, e.g., relative to existing allocation techniques. As a result, the potential for multiple uplink transmissions to overlap in a particular time-frequency resource is reduced in the system. In one or more embodiments, this proves advantageous in that it reduces the potential for inter-cell interference caused by simultaneous uplink transmissions on an overlapping frequency resource.

Figure 2:
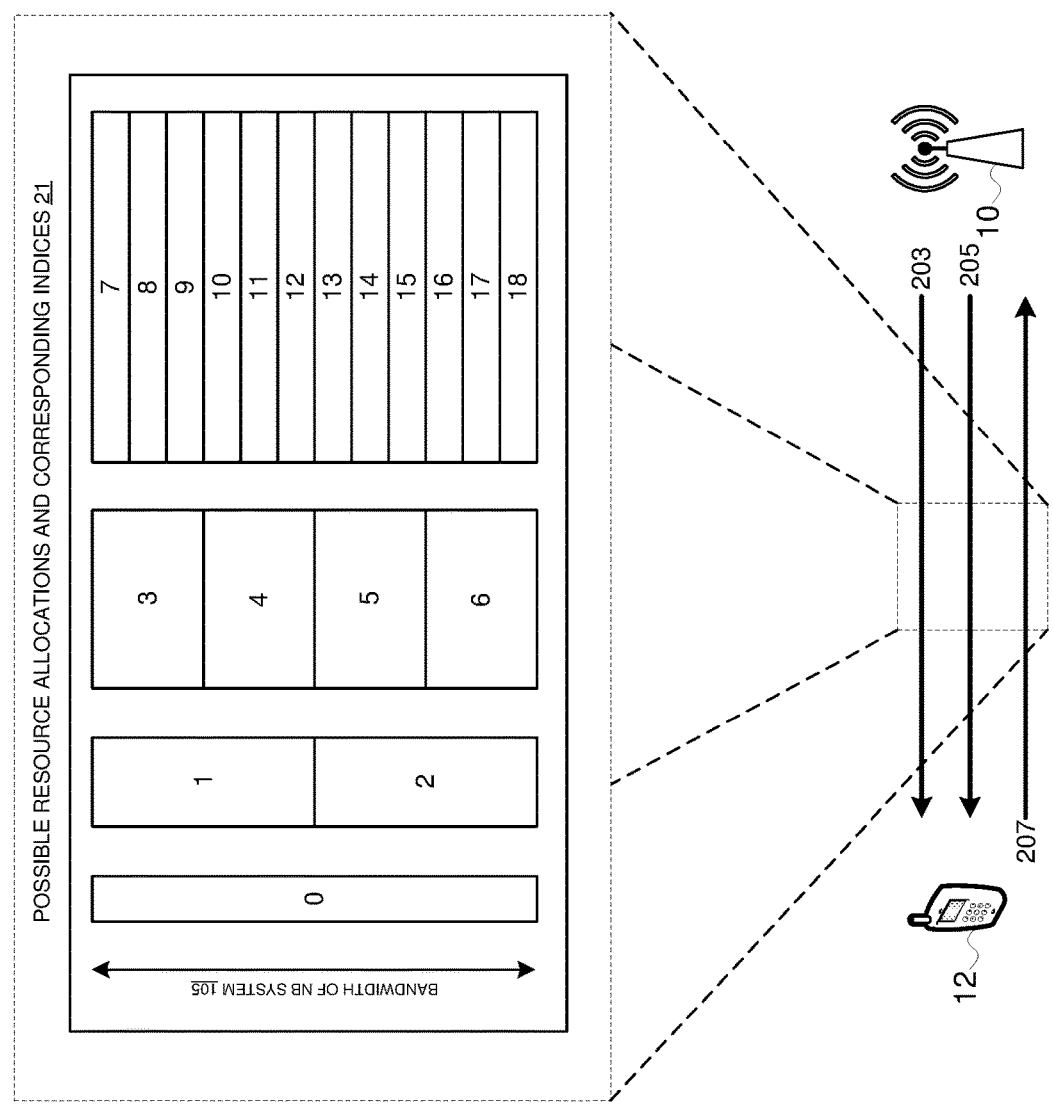
FIG. 2 is a block diagram of a wireless communication system implementing aspects of uplink resource allocation according to one or more embodiments.

FIG. 2, like FIG. 1, illustrates a first radio node and a second radio node configured to determine a resource allocation for uplink transmission in a narrowband system. In FIG. 2, the first radio node and the second radio node may correspond to radio network node 10 and wireless communication device 12, respectively, though this is not a limiting configuration. In some embodiments, as illustrated in FIG. 2, the first radio node (e.g., radio network node 10) may determine the resource allocation as part of scheduling the wireless communication. This scheduling may include transmitting control signaling to the second radio node indicating the determined resource allocation. This control signaling may take different forms in different example embodiments.

For instance, in the embodiment of FIG. 2, the control signaling includes a scheduling grant that has one of different possible values, each identifiable by a corresponding index or index identifier, corresponding to the different possible resource allocations in the set of possible resource allocations. In some embodiments, configuration information about which values of the scheduling grant correspond to which possible resource allocations are predefined or preconfigured in the radio nodes. In other embodiments, this configuration information is signaling between the radio nodes.

For example, in FIG. 2, the radio network node 10 transmits this configuration information to the wireless communication device via other control signaling 203. This other control signaling 203 may include "static" system information that is broadcasted (e.g., a master information block on the physical broadcast channel), or may include periodically or semi-statically transmitted Radio Resource Control (RRC) signaling. This RRC signaling may include "dynamic" system information (e.g., transmitted via at least one system information block (SIB or SIBx, where x denotes a particular defined SIB type)).

Regardless, as shown in the embodiment of FIG. 2, this other control signaling 203 may include information regarding all possible resource allocations that may be utilized in the system (and therefore in the cell) and may further include corresponding indices 21 (or index indicators that reference, or point to, each of these indices) identifying each of the possible resource allocations. The wireless communication device 12 may receive the other control signaling 203, and may decode and save the possible resource allocations and corresponding indices 21 in a look-up table, for instance, in its device memory. In a non-limiting aspect, this other control signaling 203 may be received and stored at device start-up, when wireless communication device 12 relocates or is handed over to a cell associated with radio network node 10, periodically thereafter, or in a semi-static or event-based manner, such as where the possible resource allocations and/or corresponding indices 21 are altered at a cell or system level. In some examples, the wireless communication device 12 may not receive the possible resource allocations and/or corresponding indices 21 via other control signaling 203, but may instead be preconfigured with this information, or a subset thereof, stored in memory.

In the embodiment of FIG. 2, the wireless communication device 12 (first radio node) may determine a resource allocation by receiving and reading further control signaling 205 from the second radio node (radio network node 10), which may indicate that the second radio node has scheduled the wireless communication to be performed over a particular uplink resource allocated to the first radio node. In other words, in some examples, the further control signaling 205 includes a scheduling grant that has one of different possible values corresponding to the different possible resource allocations in the set of possible resource allocations previously obtained by the wireless communication device 12. In an aspect, these different possible values can take the form of an index (or index indicator) that is included in the scheduling grant to identify a particular value (i.e., specific time-frequency resource(s), resource element(s), or resource block(s)) of a resource allocated to the wireless communication device 12 for uplink transmission over a shared uplink channel.

In some examples, this further control signaling 205 may take the form of a downlink control information (DCI) message and may indicate the determined uplink resource allocation by identifying an index (or indices) from the possible resource allocations (e.g., received in other control signaling 203 or preconfigured) corresponding to the resource allocation. The wireless communication device 12 may receive and read this further control information periodically, semi-statically or aperiodically, thereby indicating an uplink resource grant for the wireless communication device 12 for a particular period (e.g., a symbol, slot, subframe, frame, or any other discrete unit of time). For instance, in some examples, where the further control information 205 is communicated via a DCI message (or other RRC-layer signaling), the further control information 205 may be received and/or read by the wireless communication device once every subframe (e.g., once every 1 ms) or alternatively the further control information 205 it is received when the wireless device requires an uplink resource allocation. Once the wireless communication device 12 has determined the resource allocation, it may communicate with the radio network node 10 in the uplink by transmitting an uplink signal over the allocated resource.

As a result of implementing the embodiment of FIG. 2 and other embodiments further described below (at least those presented in reference to FIG. 3), specifying a set of possible resource configurations (e.g., via control information in 203 and/or 205 of FIG. 2, and/or using preconfigured information about the possible resource configurations in the wireless device 12) can lead to less control signaling overhead for uplink transmission scheduling relative to existing wireless communication systems. The benefits of limiting overhead communication is exacerbated by some of the defining characteristics of some narrowband systems, including limited available system bandwidth, available device processing power, and limited device battery power. Limiting such control signaling can be even more important where coverage-enhancement mechanisms are utilized in the narrowband system, given that the wireless communication devices of the system might require several repetitions of the downlink control signal for successful decoding. Any additional uplink control signaling might be at the cost of limited downlink and/or uplink radio resources can result in even more acute system-wide latency.

FIGS. 3A and 3B illustrate additional mechanisms for utilizing a limited set of possible resource allocations in a wireless communication system. For instance, in the embodiment of FIG. 3A, a set of different possible resource allocations that can possibly be utilized (e.g., those illustrated in FIG. 2, for instance) may be further limited to different subsets of possible resource allocations that may be utilized for the system. In an aspect, each of the different subsets of possible resource allocations may, like the larger possible set of FIG. 2, be signaled to the wireless communication device 12, e.g., via RRC signaling, such as via a SIB transmission or other format for transmitting system information. In other examples, the wireless communication device may be preconfigured to identify the different subsets of possible resource allocations without obtaining the information by reading the broadcast SIBs or other RRC signaling.

In an aspect, each different subset of possible resource allocations may have an associated set of indices that serves as a resource identifier, denoting the particular resource configurations of the subset. For instance, in one example, the possible available subsets may include those of Table 1, below. In Table 1, for each different possible allocation i, $m_i$ is the number of tones in the corresponding possible allocation, $N_i$ is the number of possible allocations of $m_i$ tones. For a given possible available subset, summation of the $N_i$, $$\sum_{i=0}^{3} N_i,$$

is the total number of possible allocations of the subset.

TABLE 1

| Subset Number | $m_0$ | $N_0$ | $m_1$ | $N_1$ | $m_2$ | $N_2$ | $m_3$ | $N_3$ |
|---|---|---|---|---|---|---|---|---|
| 0 | 12 | 1 | 6 | 2 | 3 | 2 | 1 | 3 |
| 1 | 12 | 1 | 3 | 4 | 1 | 3 | — | — |
| 2 | 12 | 1 | 1 | 12 | — | — | — | — |
| 3 | 6 | 2 | 3 | 2 | 1 | 3 | — | — |
| 4 | 3 | 4 | 1 | 3 | — | — | — | — |
| 5 | 1 | 12 | — | — | — | — | — | — |

The subset of possible resource allocations corresponding to Subset Number 0 is illustrated in FIG. 3A. In an aspect, a selected one of the different subsets (e.g., of Table 1) is activated at the first and second radio nodes and control signaling is subsequently transmitted, the control signaling including a scheduling grant that has one of different possible values corresponding to the different possible resource allocations (i.e., index values) in the selected one of the different subsets that is activated (Subset Number 0 in FIG. 3A). Particularly, in the embodiment of FIG. 3A, the radio network node 10 may determine that the subset of possible allocations corresponding to Subset Number 0 will be utilized for uplink grant indication and may transmit the possible allocations of the subset and the corresponding indices (here, indices 0-7) to the wireless communication device via control information 203 (e.g., SIB or other RRC signaling). This determination and transmission may result in the activation of Subset Number 0 at both radio nodes. Thereafter, while allocation according to Subset Number 0 remains in effect (remains activated), the radio network node 10 may periodically or semi-statically transmit further control information containing the index (again, here, one of 0-7) identifying the specific time-frequency radio resource corresponding to the desired uplink grant for the wireless communication device 12. Thereafter, the wireless communication device 12 may transmit in the uplink over the determined resource allocation corresponding to the received index for Subset Number 0.

The possible allocations heretofore described have assumed a uniform bandwidth for each subcarrier in the available system bandwidth 105. In some wireless communication system implementations, however, more than one subcarrier bandwidth may be utilized for uplink transmission, and accordingly, for uplink resource allocation and scheduling. Therefore, in a further aspect not specifically shown in FIG. 3A, in addition to subcarriers having a first frequency bandwidth (e.g., 15 kHz), certain defined subcarriers having a second frequency bandwidth (3.75 kHz) may also be allocated for uplink transmission. Table 2 illustrates an implementation of this concept, and is similar to Table 1, which may be implemented for resource units of 15 kHz size in a non-limiting example. In Table 2, however, 3.75 kHz bandwidth subcarriers are utilized, which are one-quarter of the bandwidth of a 15 kHz subcarrier. Thus taking one tone of 15 kHz, one can divide it into four tones having a 3.75 kHz width.

TABLE 2

Subsets of different possible resource allocations using subcarriers of two widths (15 kHz and 3.75 kHz)

| Subset Number | $m_0$ | $N_0$ | $m_1$ | $N_1$ | $m_2$ | $N_3$ | $m_3$ | |
|---|---|---|---|---|---|---|---|---|
| 0 | 12 (15 kHz) | 1 | 6 (15 kHz) | 2 | 3 (15 kHz) | 2 | 1 (3.75 kHz) | 8 |
| 1 | 12 (15 kHz) | 1 | 3 (15 kHz) | 4 | 1 (3.75 kHz) | 8 | — | — |
| 2 | 6 (15 kHz) | 2 | 1 (15 kHz) | 6 | 1 (3.75 kHz) | 4 | — | — |
| 3 | 6 (15 kHz) | 2 | 3 (15 kHz) | 2 | 1 (3.75 kHz) | 8 | — | — |
| 4 | 6 (15 kHz) | 2 | 1 (3.75 kHz) | 20 | — | — | — | — |
| 5 | 1 (3.75 kHz) | 48 | — | — | — | — | — | — |

Another example embodiment for utilizing a limited set of possible resource allocations in a wireless communication system is presented in reference to FIG. 3B. Like embodiments described above, in FIG. 3B, one or more possible resource allocations may be semi-statically configured in control information, such as via RRC signaling. Unlike in FIG. 3A, however, a single possible allocation configuration is activated. As long as this configuration remains activated, the individual possible allocations of the single configuration are identified by an associated index of a relatively limited number of possible indices corresponding to the number of individual possible allocations. For instance, in the particular implementation of FIG. 3B, only two individual possible allocations are available for uplink grants. As such, for each control signal 205 identifying an uplink allocation, only a single bit (i.e., a value of 0 or 1) is needed to communicate the uplink resource allocation for uplink transmission at 207. As such, according to the examples presented in FIGS. 3A and 3B, not only does the limited number of discrete possible allocations combat inter-cell interference, but it also can significantly reduce overhead needed to schedule uplink resources for wireless communication device transmission.

Figure 4:
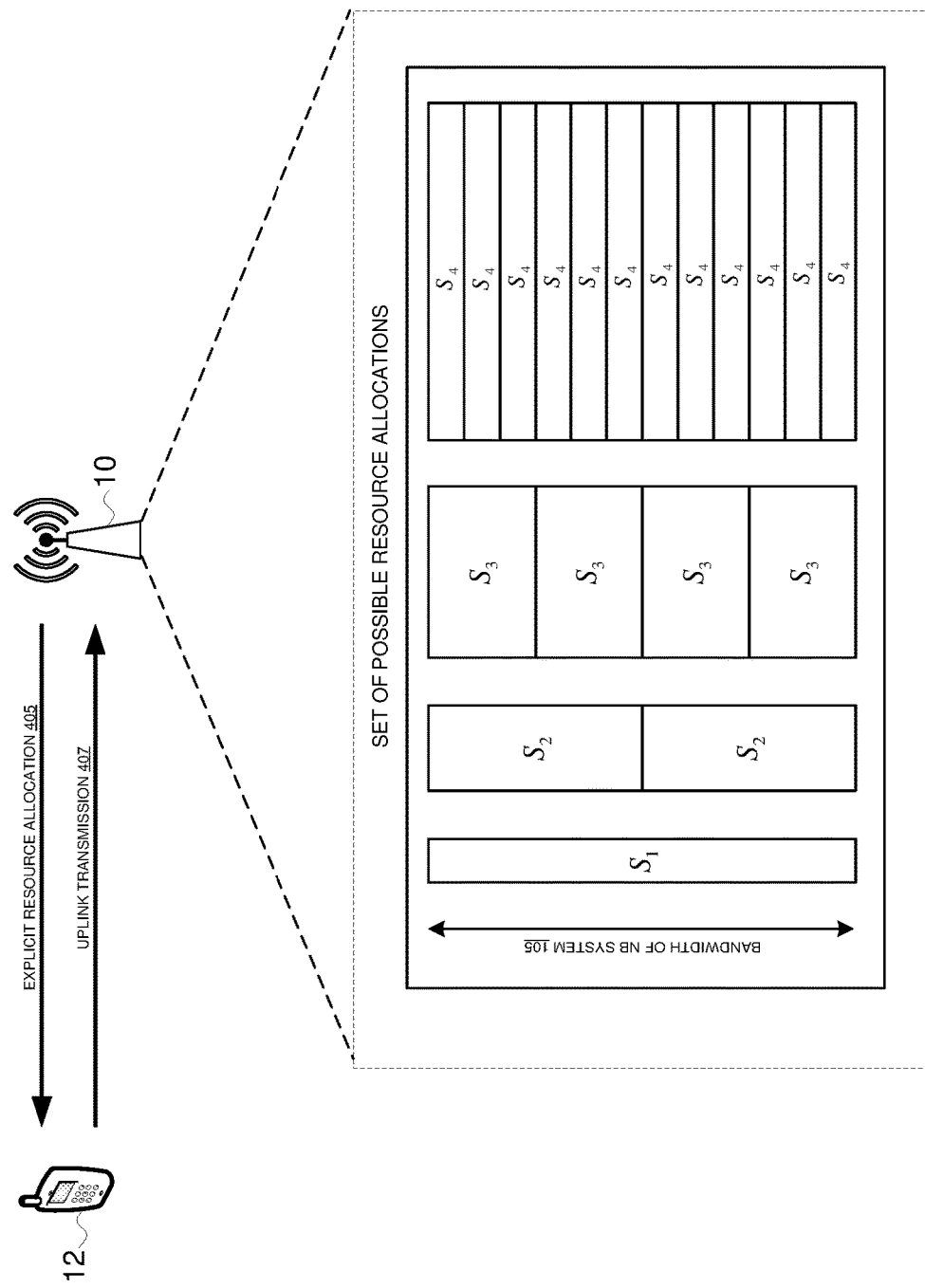
FIG. 4 is a block diagram of a wireless communication system implementing aspects of uplink resource allocation according to one or more embodiments.

In a further embodiment, rather than signaling an index or other identifier pointing to one of a set of possible resource allocations to the wireless communication device 12 in a control message (e.g., DCI message), the radio network node 10 may instead determine the resource allocation according to the set of possible resource allocations (i.e., without communicating the set to the wireless communication device 12) and instead transmit an explicit resource allocation/grant 405 to the wireless communication device. This explicit resource allocation 405, therefore, will still comport with the set of possible resource allocations that mitigates inter-cell interference, as it is chosen from the set in a manner that leaves the wireless communication device 12 blind to the determination. Although this explicit determination may require a specific subcarrier/frequency range identifier and a time resource identifier to define the uplink time-frequency resource granted, the potentially significant overhead signaling that is introduced by signaling the entire set of possible resource allocations in other embodiments is avoided in the embodiment of FIG. 4.

In an additional aspect, when considering the multi-cell interplay of uplink transmissions in the wireless communication system, any determined resource allocation may occur at the same time as and may overlap in frequency with another resource allocation from the set allocated for wireless communication between other radio nodes of another cell. As introduced above, however, as the number of possible allocations are reduced relative to some current allocations schemes, aspects of the present embodiments reduce the likelihood that DMRS sequences having poor correlation properties (i.e., high correlation) are utilized for any such frequency overlapping and/or contemporaneous uplink transmissions in disparate cells of the system. Though not mentioned specifically above, wireless communications of the present disclosure not only include user data or control/cell measurement/power feedback data, but may also include periodic DMRS transmissions that establish the orthogonality between such overlapping/contemporaneous signals to hedge against potential inter-cell interference.

In another system-level consideration, any cell-specific resource allocation structure may or may not be communicated to other network devices that are not associated with a particular cell implementing the specific resource allocation structure. Accordingly, in some examples, the possible uplink resource allocation configurations of a cell (or sector, or any other discrete service area maintained by a particular radio network node 10) are not specified explicitly in a predefined manner and not communicated within the network. It is then up to an individual scheduler (i.e., a radio network node 10 or a scheduling component therein) to determine the allocations in line with the possible configurations allowed by constraints described herein. However, this does not guarantee the mitigation of inter-cell interference since one or more radio network nodes (or schedulers) can also allocate uplink radio resources freely (i.e., without being limited by the scheduling constraints presented herein).

In other embodiments, the uplink resource configurations are not specified explicitly in a predefined manner, but are communicated across radio network nodes 10 via the X2 interface (i.e., inter-eNodeB interface). The radio network nodes 10 can then determine uplink resource configurations and associated possible resource allocations that can help mitigate inter-cell interference.

In another embodiment, the NB-PUSCH resource configurations are specified explicitly and/or signaled using control information signaling (e.g., system information or other RRC signaling). Such an implementation is described, for example in the embodiments of FIGS. 2-4.

Furthermore, for communications described herein, any "allocation," "resource allocation," "resource," "radio resource," or similar terminology may correspond to frequency resources (e.g., sub-carriers), time resources (e.g., OFDM symbols or time slots), or combinations thereof (e.g., radio blocks in LTE). In addition, although not described in particular detail above, different resource allocations having different span sizes may also have different corresponding time spans in the time domain. For instance, in an aspect, though not limiting, any 12-tone allocation may have a 1 ms time span, any 6-tone allocation may have a 2 ms time span, any 3-tone allocation may have a 4 ms time span, and any single-tone allocation may have an 8 ms time span. Neither these time span values nor the relative magnitudes of these values are limiting and only serve as an illustrative example of a possible implementation.

In at least some embodiments, the radio network node 10 and wireless communication device 12 operate according to narrowband Internet of Things (NB-IoT) specifications. In this regard, embodiments described herein are explained in the context of operating in or in association with a RAN that communicates over radio communication channels with wireless communication devices, also interchangeably referred to as wireless terminals or UEs, using a particular radio access technology. More specifically, embodiments are described in the context of the development of specifications for NB-IoT, particularly as it relates to the development of specifications for NB-IoT operation in spectrum and/or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

A radio network node 10 herein is any type of network node capable of communicating with another node over radio signals. In example embodiments, the radio network node 10 can be a base station 10 in a wireless communication system, and as such, the radio network node 10 of FIG. 1 may be referred to throughout the present disclosure as base station 10. A wireless communication device 12 is any type of device capable of communicating with a radio network node 10 over radio signals. A wireless communication device 12 may therefore refer to a machine-to-machine (M2M) device, a machine-type communications (MTC) device, a NB-IoT device, etc. As the wireless communication device 12 may be a user equipment, or "UE," in some examples, for purposes of the present disclosure, the wireless communication device 12 of FIG. 1 may be referred to herein as a user equipment. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Figure 5:
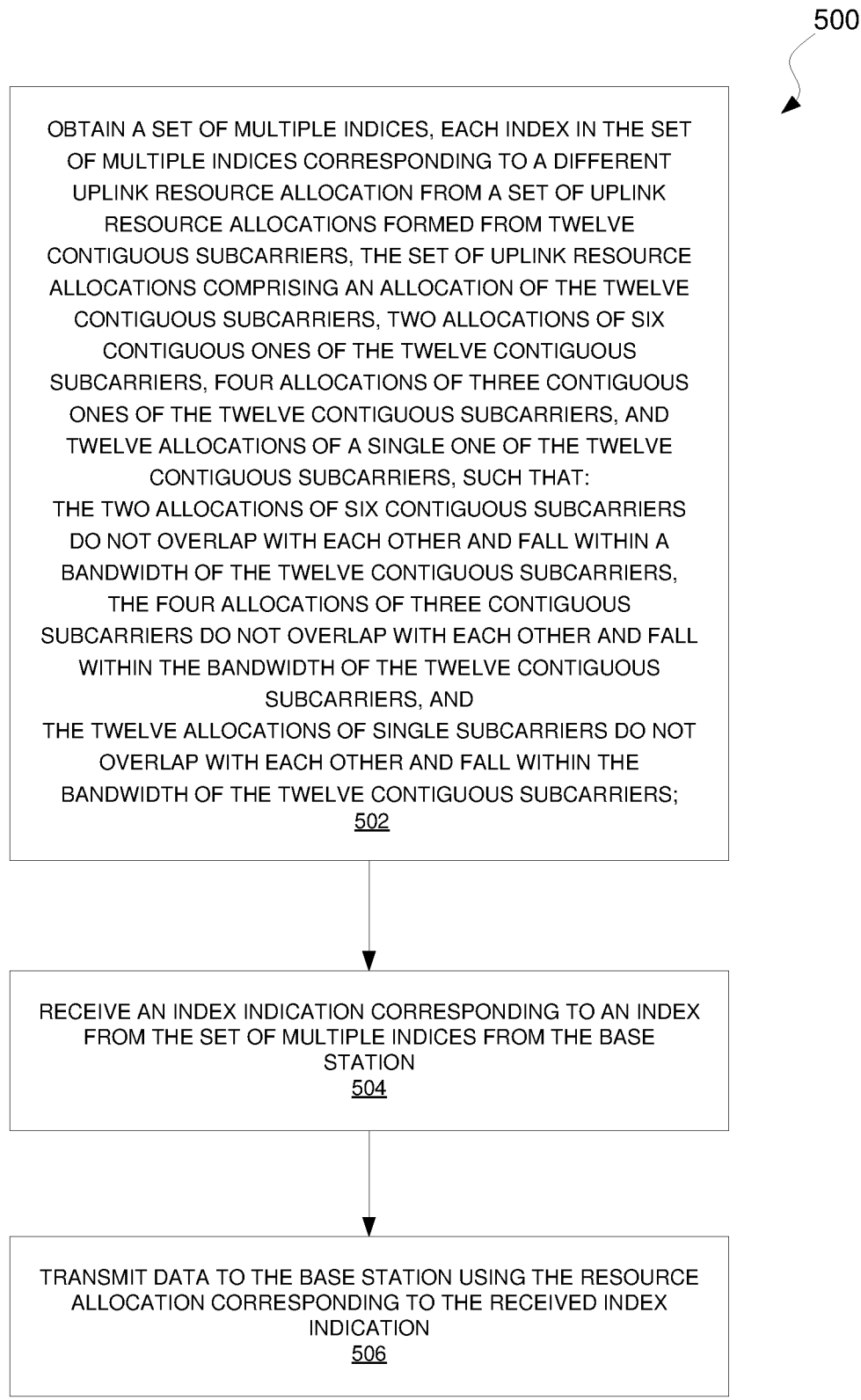
FIG. 5 is a logic flow diagram of a method implemented by a user equipment according to one or more embodiments.

In view of the modifications and variations described above, FIGS. 5-7 described below present example methods for wireless communication and uplink channel resource allocation in a wireless communication environment. FIG. 5, for instance, presents an example method 500 implemented by a user equipment 12 (also referred to herein as wireless communication device 12) for performing wireless communication with a base station 10 in a narrowband communication system.

In an example of method 500, at block 502, the user equipment 12 may obtain a set of multiple indices, where each index in the set of multiple indices corresponds to a different uplink resource allocation from a set of uplink resource allocations formed from twelve contiguous subcarriers. In an aspect, the set of uplink resource allocations includes an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers. Additionally, these allocations may be arranged such that the two allocations of six contiguous subcarriers do not overlap with each other and fall within a bandwidth of the twelve contiguous subcarriers, the four allocations of three contiguous subcarriers do not overlap with each other and fall within the bandwidth of the twelve contiguous subcarriers, and the twelve allocations of single subcarriers do not overlap with each other and fall within the bandwidth of the twelve contiguous subcarriers.

In a further aspect of method 500 at block 504, the user equipment can receive an index indication or value corresponding to an index from the set of multiple indices from the base station. Furthermore, at block 506, the user equipment can transmit data to the base station using the resource allocation corresponding to the received index indication.

In addition to these aspects of FIG. 5 that are shown explicitly, other example aspects may be implemented in further embodiments. For instance, the index indication may be the index itself, while in some examples, the index indication may reference or "point to" the index that is indicated. The index indication may also be a value, e.g. as discussed above, corresponding to an index to be indicated. Furthermore, as introduced above, the narrowband communication system may be narrowband Internet of Things (NB-IoT) system in some examples, and may be deployed in-band or in a guard band of a Long Term Evolution (LTE) system in the same or alternative embodiments.

Furthermore, in some examples of method 500 each of the twelve contiguous subcarriers has a 15 kHz bandwidth, although this is by no means limiting. In addition, the user equipment may utilize a narrowband physical uplink shared channel (NB-PUSCH) in the narrowband communication system for data transmission in method 500, and the NB-PUSCH may include the set of uplink resource allocations, each having a corresponding index. Also, in some instances, the user equipment may be preconfigured with the set of multiple indices, such that the user equipment is configured to obtain the set by reading the preconfigured set of multiple indices for example from a memory of the user equipment. In some embodiments, the set of multiple indices contains 19 indices, and the received index indication may be made up of 6 bits, 5 bits, or any number of bits less than 5 bits. Where the index indication contains less than 5 bits, the user equipment may receive at least one further index indication identifying one or more secondary resource allocations for the user equipment. This is an optimization feature that can lessen overhead of the system, as the additional bits of the "less than 5 bits" index indication would otherwise go unused if a further (e.g., corresponding to a subsequent uplink transmission interval) index indication was not wholly or partially packaged and communicated along with the index indication of method 500.

Additionally, the index indication can be received in any type of downlink message (including but not limited to broadcast/multicast messages and dedicated control channel messages). These messages may include, but are not limited to, at least one system information block (SIB) transmitted by the base station, message(s) communicated via radio resource control (RRC) signaling, and/or at least one downlink control information (DCI) message transmitted by the base station. In instances wherein the at least one DCI serves as the message vehicle, it/they may have an associated DCI format of N0, though not limited to such a format in all cases.

Figure 6:
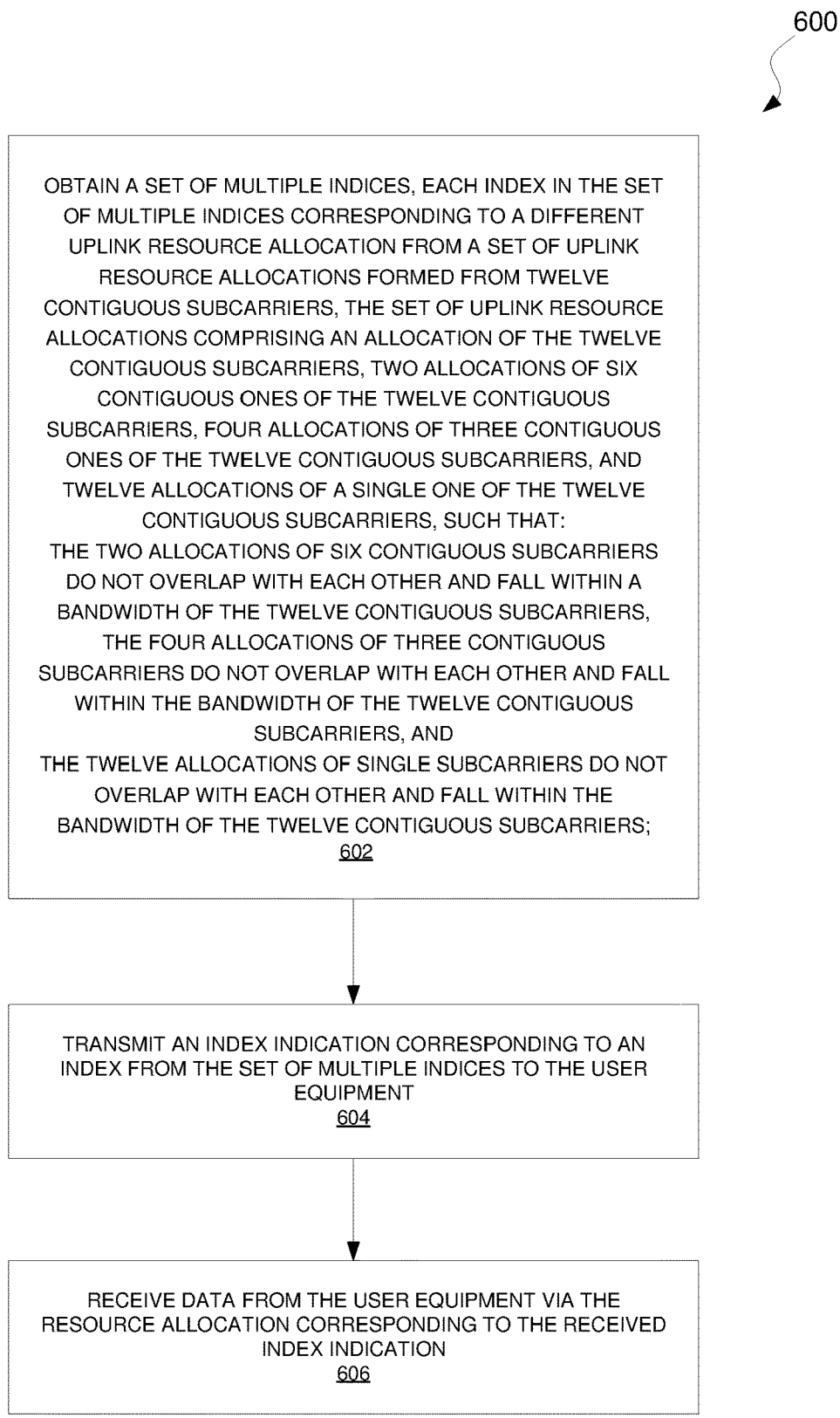
FIG. 6 is a logic flow diagram of a method implemented by a base station according to one or more embodiments.

FIG. 6 presents an example method 600 implemented by a base station 10 (also referred to herein as radio network node 10) for performing wireless communication with a user equipment 12 in a narrowband communication system.

In an example of method 600, at block 602, the base station 10 may obtain a set of multiple indices, where each index in the set of multiple indices corresponds to a different uplink resource allocation from a set of uplink resource allocations formed from twelve contiguous subcarriers. In an aspect, the set of uplink resource allocations includes an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers. Additionally, these allocations may be arranged such that the two allocations of six contiguous subcarriers do not overlap with each other and fall within a bandwidth of the twelve contiguous subcarriers, the four allocations of three contiguous subcarriers do not overlap with each other and fall within the bandwidth of the twelve contiguous subcarriers, and the twelve allocations of single subcarriers do not overlap with each other and fall within the bandwidth of the twelve contiguous subcarriers.

In a further aspect of method 600 at block 604, the base station 10 can transmit, to the user equipment 12, an index indication corresponding to an index from the set of multiple. Furthermore, at block 606, the base station 10 can receive data from the user equipment 12 using the resource allocation corresponding to the transmitted index indication.

In addition to these aspects of FIG. 6 that are shown explicitly, other example aspects may be implemented in further embodiments. For instance, the index indication may be the index itself, while in some examples, the index indication may reference or "point to" the index that is indicated. Furthermore, as introduced above, the narrowband communication system may be narrowband Internet of Things (NB-IoT) system in some examples, and may be deployed in-band or in a guard band of a Long Term Evolution (LTE) system in the same or alternative embodiments.

Furthermore, in some examples of method 600 each of the twelve contiguous subcarriers has a 15 kHz bandwidth, although this is by no means limiting. In addition, the user equipment may utilize a narrowband physical uplink shared channel (NB-PUSCH) in the narrowband communication system for data transmission in method 600, and the NB-PUSCH may include the set of uplink resource allocations, each having a corresponding index. Also, in some instances, the base station 10 may be preconfigured with the set of multiple indices, such that the base station 10 is configured to obtain the set by reading the preconfigured set of multiple indices. In some embodiments, the set of multiple indices contains 19 indices, and the received index indication may be made up of 6 bits, 6 bits, or any number of bits less than 6 bits. Where the index indication contains less than 6 bits, the base station 10 may transmit at least one further index indication identifying one or more secondary resource allocations for the user equipment. This is an optimization feature that can lessen overhead of the system, as the additional bits of the "less than 6 bits" index indication would otherwise go unused if a further (e.g., corresponding to a subsequent uplink transmission interval) index indication was not wholly or partially packaged and communicated along with the index indication of method 600.

Additionally, the index indication can be transmitted by the base station 10 in any type of downlink message (including but not limited to broadcast/multicast messages and dedicated control channel messages). These messages may include, but are not limited to, at least one system information block (SIB) transmitted by the base station, message(s) communicated via radio resource control (RRC) signaling, and/or at least one downlink control information (DCI) message transmitted by the base station. In instances wherein the at least one DCI serves as the message vehicle, it/they may have an associated DCI format of N0, though not limited to such a format in all cases.

Figure 7:
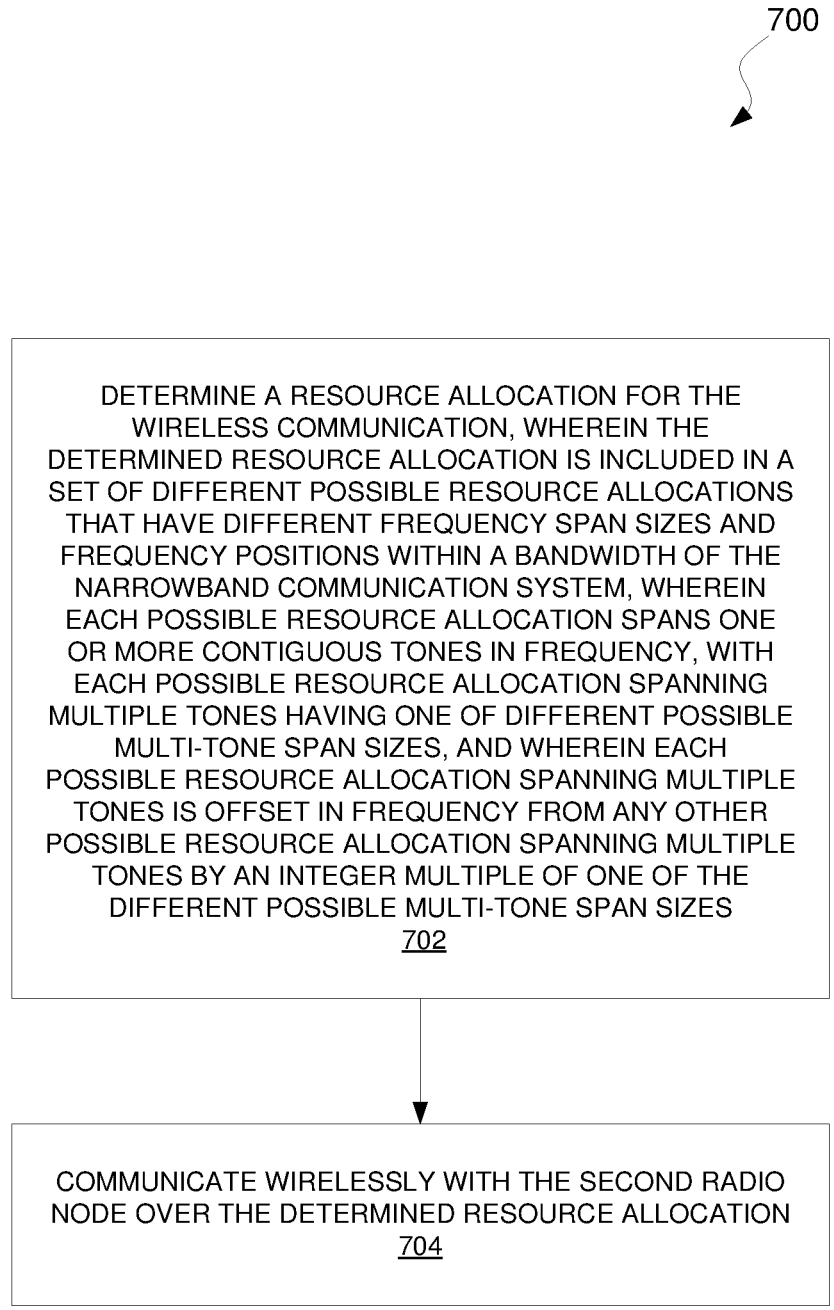
FIG. 7 is a logic flow diagram of a method implemented by a radio network node according to one or more embodiments.

FIG. 7 presents a flow diagram containing aspect of an example method 700 for uplink radio resource allocation and wireless communication, which may be implemented by a first radio node of the present disclosure, which may include a radio network node 10 or a wireless communication device 12 in example embodiments. As shown in FIG. 7, method 700 may include, at block 702, determining a resource allocation for the wireless communication. The determined resource allocation is included in a set of different possible resource allocations that have different frequency span sizes and frequency positions within a bandwidth of the narrowband communication system. Each possible resource allocation spans one or more contiguous tones in frequency, with each possible resource allocation spanning multiple tones having one of different possible multi-tone span sizes. Each possible resource allocation spanning multiple tones is offset in frequency from any other possible resource allocation spanning multiple tones by an integer multiple of one of the different possible multi-tone span sizes. The method 700 also includes, at block 704, communicating wirelessly with the second radio node over the determined resource allocation.

Furthermore, although not shown in FIG. 7, method 700 may include further aspects, including but not limited to those disclosed in one or more of the enumerated embodiments below.

Note that the radio network node 10 (also referred to herein, in some examples, as base station 10) as described above may perform the processing herein by implementing any functional means or units. In one embodiment, for example, the radio network node 10 comprises respective circuits configured to perform the steps shown in FIG. 7. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 8A:
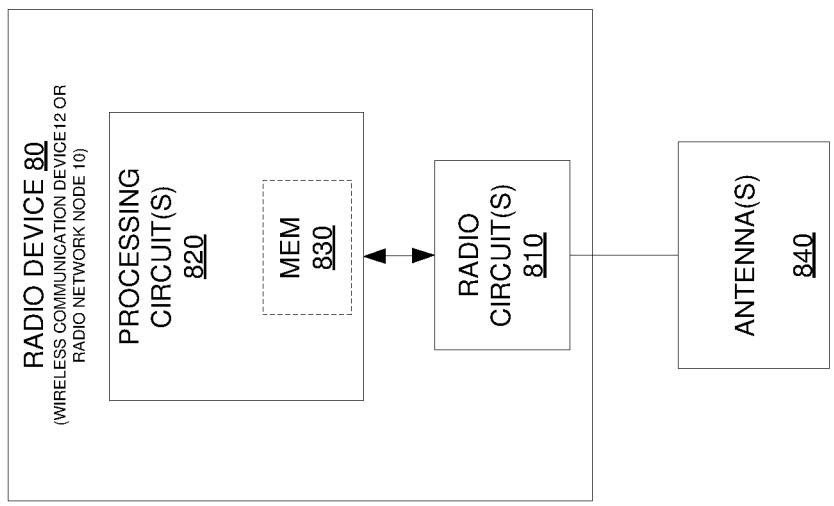
FIG. 8A illustrates additional details of a radio device 80 in accordance with one or more embodiments.

FIG. 8A illustrates additional details of a radio device 80 in accordance with one or more embodiments. As indicated by the figure, the radio device 80 represents any device of the present disclosure that communicates wirelessly, and therefore may constitute a wireless communication device 12 (or user equipment 12) or a radio network node 10 (or base station 10). As shown, the radio device 80 includes one or more processing circuits 820 and one or more radio circuits 810. The one or more radio circuits 810 are configured to transmit via one or more antennas 840. The one or more processing circuits 820 are configured to perform processing described above, e.g., in FIGS. 1-7, such as by executing instructions stored in memory 830.

In examples where the radio device 80 is a user equipment 12, the one or more processing circuits 820 may be configured to obtain the set of multiple indices that correspond to different uplink resource allocations, as described, for instance, with respect to block 502 of FIG. 5. In particular, in embodiments where the user equipment 12 is preconfigured with the set of multiple indices, the set can be stored at the memory 830. Accordingly, the one or more processing circuits 820 can obtain the set of multiple indices by reading the set of multiple indices (or a portion thereof) from the memory 830. In embodiments where the user equipment 12 obtains the set of multiple indices by receiving it in one or more communications (e.g., from base station 10), one or more radio circuits 810 may obtain the set of multiple indices. Furthermore, when an index (or index indication) is received from a base station 10 (i.e., an uplink resource grant is indicated), the one or more radio circuits 810 can receive the index (or index indication) and send it to the one or more processing circuits 820 for processing. Furthermore, the one or more processing circuits 820 may generate data and/or prepare data for transmission over the indicated uplink resource and can perform the transmission of the data over the uplink resource in conjunction with the one or more radio circuits 810.

In examples where the radio device 80 is a base station 10, the one or more processing circuits 820 may be configured to obtain the set of multiple indices that correspond to different uplink resource allocations, as described, for instance, with respect to block 602 of FIG. 6. In particular, in embodiments where the base station 10 is preconfigured with the set of multiple indices, the set can be stored at the memory 830. Accordingly, the one or more processing circuits 820 can obtain the set of multiple indices by reading the set of multiple indices (or a portion thereof) from the memory 830. Furthermore, when an index (or index indication) is transmitted to a user equipment 12 (i.e., an uplink resource grant is indicated), the one or more processing circuits 820 can generate the index (or index indication) and transmit it to the user equipment 12, for instance, in conjunction with one or more radio circuits 810. Furthermore, the one or more radio circuits 810 may receive data over the indicated uplink resource and can send the received data to the one or more processing circuits 820 for processing.

Figure 8B:
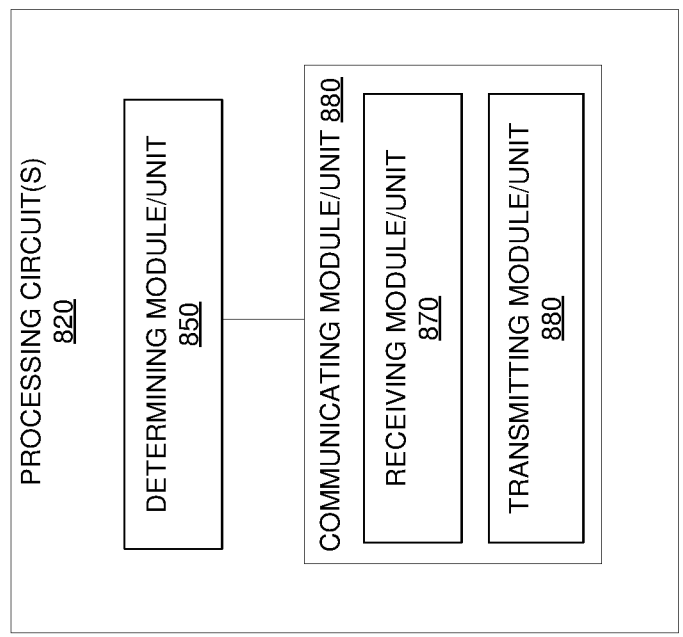
FIG. 8B is a functional block diagram of a processing circuit for a radio device.

FIG. 8B illustrates further aspects of the one or more processing circuits 820, which may implement certain functional means or units. Specifically, the processing circuit(s) 820 may implement a determining module/unit 850 for determining a resource allocation as described above and a communicating module/unit 880 for communicating wirelessly over the determined resource allocation. This communicating module/unit 880 may for instance include a receiving module/unit 870 for receiving over the determined allocation and/or a transmitting module/unit 880 for transmitting over the determined allocation or transmitting in the downlink over a control channel in the case of the radio network node 10 (or base station 10).

Additional details of the base station 10 are shown in relation to FIG. 9. As shown in FIG. 9, the example base station 10 includes an antenna 940, radio circuitry (e.g. radio front-end circuitry) 910, processing circuitry 920, and the base station 10 may also include a memory 930. The processing circuitry 920, which may correspond to the one or more processing circuits 820 of FIGS. 8A and/or 8B, may be configured to obtain the set of multiple indices that correspond to different uplink resource allocations, as described, for instance, with respect to block 602 of FIG. 6. In particular, in embodiments where the base station 10 is preconfigured with the set of multiple indices, the set can be stored at the memory 930. Accordingly, the processing circuitry 920 can obtain the set of multiple indices by reading the set of multiple indices (or a portion thereof) from the memory 930. Furthermore, when an index (or index indication) is transmitted to a user equipment 12 (i.e., an uplink resource grant is indicated), the processing circuitry 920 can generate the index (or index indication) and transmit it to the user equipment 12, for instance, in conjunction with radio circuitry 910. Furthermore, the radio circuitry 910 may receive data over the indicated uplink resource and can send the received data to the processing circuitry 920 for processing.

The memory 930 may be separate from the processing circuitry 920 or an integral part of processing circuitry 920. Antenna 940 may include one or more antennas or antenna arrays, and is configured to send and/or receive wireless signals, and is connected to radio circuitry (e.g. radio front-end circuitry) 910. In certain alternative embodiments, base station 10 may not include antenna 940, and antenna 940 may instead be separate from base station 10 and be connectable to base station 10 through an interface or port.

The radio circuitry (e.g. radio front-end circuitry) 910 may comprise various filters and amplifiers, is connected to antenna 940 and processing circuitry 920, and is configured to condition signals communicated between antenna 940 and processing circuitry 920. In certain alternative embodiments, base station 10 may not include radio circuitry (e.g. radio front-end circuitry) 910, and processing circuitry 920 may instead be connected to antenna 940 without front-end circuitry 910.

Processing circuitry 920 may include one or more of radio frequency (RF) transceiver circuitry, baseband processing circuitry, and application processing circuitry. In some embodiments, the RF transceiver circuitry 921, baseband processing circuitry 922, and application processing circuitry 923 may be on separate chipsets. In alternative embodiments, part or all of the baseband processing circuitry 922 and application processing circuitry 923 may be combined into one chipset, and the RF transceiver circuitry 921 may be on a separate chipset. In still alternative embodiments, part or all of the RF transceiver circuitry 921 and baseband processing circuitry 922 may be on the same chipset, and the application processing circuitry 923 may be on a separate chipset. In yet other alternative embodiments, part or all of the RF transceiver circuitry 921, baseband processing circuitry 922, and application processing circuitry 923 may be combined in the same chipset. Processing circuitry 920 may include, for example, one or more central processing units (CPUs), one or more microprocessors, one or more application specific integrated circuits (ASICs), and/or one or more field programmable gate arrays (FPGAs).

The base station 10 may include a power source 950. The power source 950 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 910, processing circuitry 920, and/or memory 930. The power source 950, battery, power supply circuitry, and/or power management circuitry are configured to supply base station 10, including processing circuitry 920, with power for performing the functionality described herein.

Figure 10:
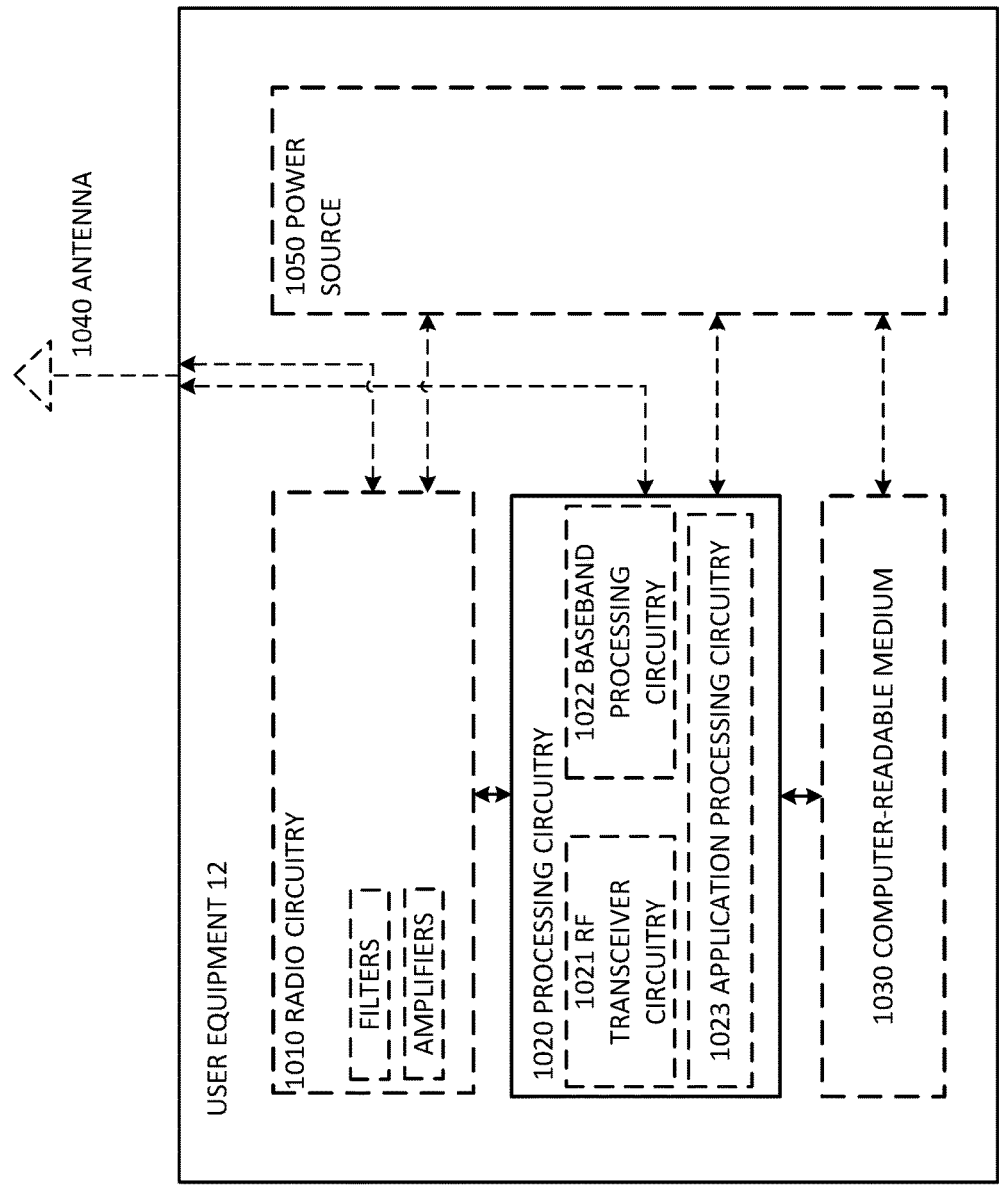
FIG. 10 is a block diagram of a user equipment according to one or more embodiments.

Additional details of the user equipment 12 are shown in relation to FIG. 10. As shown in FIG. 10, the example user equipment 12 includes an antenna 1040, radio circuitry (e.g. radio front-end circuitry) 1010, processing circuitry 1020, and the user equipment 12 may also include a memory 1030. The processing circuitry 1020, which may correspond to the one or more processing circuits 820 of FIG. 8A and/or 8B, may be configured to obtain the set of multiple indices that correspond to different uplink resource allocations, as described, for instance, with respect to block 502 of FIG. 5. In particular, in embodiments where the user equipment 12 is preconfigured with the set of multiple indices, the set can be stored at the memory 1030. Accordingly, the processing circuitry 1020 can obtain the set of multiple indices by reading the set of multiple indices (or a portion thereof) from the memory 1030. In embodiments where the user equipment 12 obtains the set of multiple indices by receiving it in one or more communications (e.g., from base station 10), radio circuitry 1010 may obtain the set of multiple indices. Furthermore, when an index (or index indication) is received from a base station 10 (i.e., an uplink resource grant is indicated), the radio circuitry 1010 can receive the index (or index indication) and send it to the processing circuitry 1020 for processing. Furthermore, the processing circuitry 1020 may generate data and/or prepare data for transmission over the indicated uplink resource and can perform the transmission of the data over the uplink resource in conjunction with the radio circuitry 1010.

The memory 1030 may be separate from the processing circuitry 1020 or an integral part of processing circuitry 1020. Antenna 1040 may include one or more antennas or antenna arrays, and is configured to send and/or receive wireless signals, and is connected to radio circuitry (e.g. radio front-end circuitry) 1010. In certain alternative embodiments, user equipment 12 may not include antenna 1040, and antenna 1040 may instead be separate from user equipment 12 and be connectable to user equipment 12 through an interface or port.

The radio circuitry (e.g. radio front-end circuitry) 1010 may comprise various filters and amplifiers, is connected to antenna 1040 and processing circuitry 1020, and is configured to condition signals communicated between antenna 1040 and processing circuitry 1020. In certain alternative embodiments, user equipment 12 may not include radio circuitry (e.g. radio front-end circuitry) 1010, and processing circuitry 1020 may instead be connected to antenna 1040 without front-end circuitry 1010.

Processing circuitry 1020 may include one or more of radio frequency (RF) transceiver circuitry, baseband processing circuitry, and application processing circuitry. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

The user equipment 12 may include a power source 1050. The power source 1050 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1010, processing circuitry 1020, and/or memory 1030. The power source 1050, battery, power supply circuitry, and/or power management circuitry are configured to supply user equipment 12, including processing circuitry 1020, with power for performing the functionality described herein.

Though not explicitly described above, the present disclosure envisions further example embodiments that may be related to aspects of the above-described embodiments. As such, the above-described embodiments are not limiting. What is more, additional or alternative embodiments associated with or performed by the base station 10 and by the user equipment or wireless communication device 12 may be utilized in some implementations.

Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium.

For example, in addition to the examples presented above, the present disclosure presents the following enumerated embodiments as embodying exemplary aspects of the invention. In a first enumerated embodiment, a method implemented by a first radio node is presented for performing wireless communication with a second radio node in a narrowband communication system. In an aspect, this example method may include determining a resource allocation for the wireless communication. The determined resource allocation is included in a set of different possible resource allocations that have different frequency span sizes and frequency positions within a bandwidth of the narrowband communication system, where each possible resource allocation spans one or more contiguous tones in frequency, with each possible resource allocation spanning multiple tones having one of different possible multi-tone span size. In addition, each possible resource allocation can span multiple tones is offset in frequency from any other possible resource allocation spanning multiple tones by an integer multiple of one of the different possible multi-tone span sizes. This first enumerated embodiment can also include communicating wirelessly with the second radio node over the determined resource allocation.

In a second exemplary embodiment, different possible multi-tone span sizes are limited to integer factors of a largest one of the different possible multi-tone span sizes.

In a third enumerated embodiment, the largest one of the different possible multi-tone span sizes comprises twelve tones, and wherein the other different possible multi-tone span sizes are limited to six tones, three tones, and one tone.

In a fourth enumerated embodiment, the determining of a resource allocation is performed as part of scheduling the wireless communication, where the method further comprises transmitting control signaling to the second radio node indicating the determined resource allocation.

In a fifth enumerated embodiment, the resource allocation determination can include reading control signaling from the second radio node indicating that the second radio node has scheduled the wireless communication to be performed over the determined resource allocation.

In a sixth enumerated embodiment, the control signaling comprises a scheduling grant that has one of different possible values corresponding to the different possible resource allocations in the set.

In a seventh enumerated embodiment, the set of different possible resource allocations comprises different subsets of possible resource allocations where a selected one of the different subsets is activated at the first and second radio nodes, and where the control signaling comprises a scheduling grant that has one of different possible values corresponding to the different possible resource allocations in the selected one of the different subsets that is activated.

In an eighth exemplary embodiment, the different subsets is selected to be activated is semi-statically signaled via radio resource control signaling.

In a ninth exemplary embodiment, a subset of the different subsets is selected to be activated is signaled in system information.

In a tenth exemplary embodiment, the scheduling grant is included in Downlink Control Information (DCI).

In an eleventh exemplary embodiment, the wireless communication includes transmission of a demodulation reference signal within the determined resource allocation.

In a twelfth exemplary embodiment, the determined resource allocation occurs at the same time as and overlaps in frequency with another resource allocation from the set allocated for wireless communication between other radio nodes, with each wireless communication including transmission of a demodulation reference signal.

In a thirteenth exemplary embodiment, the demodulation reference signals are formed from a cyclic shift of different base sequences.

In a fourteenth exemplary embodiment, the narrowband communication system is a narrowband Internet of Things system.

In a fifteenth exemplary embodiment, the narrowband communication system is deployed in-band or in a guard band of a Long Term Evolution system.

In a sixteenth exemplary embodiment, a first radio node for performing wireless communication with a second radio node in a narrowband communication system is presented, the first radio node configured to determine a resource allocation for the wireless communication, wherein the determined resource allocation is included in a set of different possible resource allocations that have different frequency span sizes and frequency positions within a bandwidth of the narrowband communication system. Each possible resource allocation spans one or more contiguous tones in frequency, with each possible resource allocation spanning multiple tones having one of different possible multi-tone span sizes, and wherein each possible resource allocation spanning multiple tones is offset in frequency from any other possible resource allocation spanning multiple tones by an integer multiple of one of the different possible multi-tone span sizes. The first radio node communicate wirelessly with the second radio node over the determined resource allocation.

A seventeenth exemplary embodiment includes a first radio node for performing wireless communication with a second radio node in a narrowband communication system. The first radio node includes a determining module for determining a resource allocation for the wireless communication, where the determined resource allocation is included in a set of different possible resource allocations that have different frequency span sizes and frequency positions within a bandwidth of the narrowband communication system. Each possible resource allocation spans one or more contiguous tones in frequency, with each possible resource allocation spanning multiple tones having one of different possible multi-tone span sizes. Also, each possible resource allocation spanning multiple tones is offset in frequency from any other possible resource allocation spanning multiple tones by an integer multiple of one of the different possible multi-tone span sizes. The first radio node also includes a communicating module for communicating wirelessly with the second radio node over the determined resource allocation.

An eighteenth exemplary embodiment includes a computer program including instructions which, when executed by at least one processor of a radio node, causes the radio node to perform the method of any of the first through fifteenth embodiments above.

A nineteenth exemplary embodiment includes a carrier containing the computer program of the eighteenth embodiment, wherein the carrier is one of an electronic signal, optical signal, radio signal, or computer readable storage medium.

The following disclosure presents aspects that, in addition to reiterating features presented above, describe further details regarding the example embodiments. These additional or alternative features can be combined with the aspects of the preceding disclosure, and therefore may be combined with the features above to render additional example embodiments. As described above, the present disclosure describes techniques for NB-PUSCH resource allocation. The objectives of NB-IoT specifications are to specify a radio access technology for cellular internet of things that addresses improved indoor coverage, support for massive number of low throughput devices, low delay sensitivity, ultra-low device cost, low device power consumption and (optimized) network architecture. NB-IOT should support 3 different modes of operation:

1. "Stand-alone operation" utilizing for example the spectrum currently being used by GERAN systems as a replacement of one or more GSM carriers, as well as scattered spectrum for potential IoT deployment.
2. "Guard band operation" utilizing the unused resource blocks within a LTE carrier's guard-band
3. "In-band operation" utilizing resource blocks within a normal LTE carrier NB-IoT should also support these transmission formats:
1. UL multi-tone transmission based on 15 kHz subcarrier spacing:
   a. Transmissions based on 12 tones are supported with 1 msec resource unit size
   b. Transmissions based on 6 tones are supported with 2 msec resource unit size
   c. Transmissions based on 3 tones are supported with 4 msec resource unit size
2. UL single-tone transmission based on 15 kHz subcarrier spacing with 8 msec resource unit size
3. UL single-tone transmission based on 3.75 kHz subcarrier spacing with 32 msec resource unit size In this disclosure, NB-PUSCH resource allocations are discussed, and particularly highlight solutions for potential inter-cell interference issues, as well as measures to reduce the dynamic control signalling overhead (i.e. number of DCI bits) required to schedule NB-PUSCH.

Figure 11:
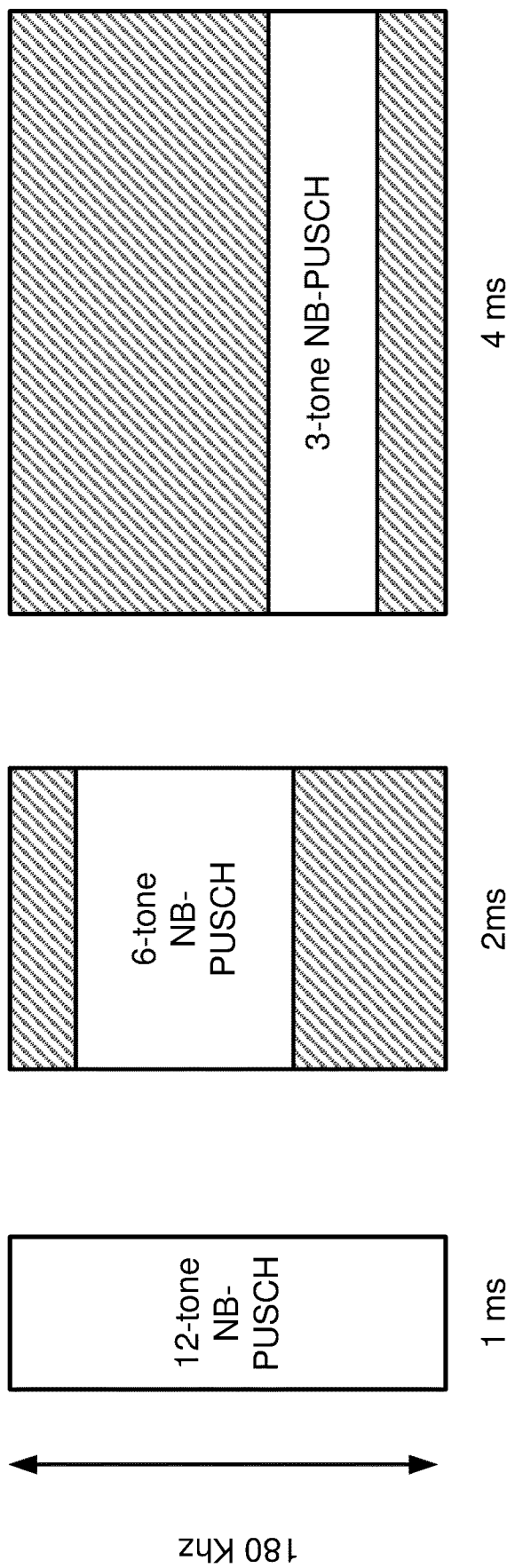
FIG. 11 is a diagram illustrating an example resource allocation for multi-tone uplink transmission on a shared uplink channel according to one or more embodiments.

The multi-tone transmission schemes for NB-PUSCH are illustrated in FIG. 11. In general, the NB-PUSCH transmissions may occupy any available set of contiguous subcarriers in the uplink. Single-tone NB-PUSCH transmissions can occupy any of the 12 (48) available subcarriers for 15 kHz (3.75 kHz) numerology. Within a NB-IOT carrier, multiplexing of single-/multi-tone transmissions that use 15 kHz subcarrier spacing and single-tone transmissions that use 3.75 kHz subcarrier spacing is allowed.

The NB-PUSCH frame structure has not yet been finalized, but is likely to be similar to the LTE PUSCH frame structure. This implies that at least for multi-tone NB-PUSCH transmission, two SC-FDMA symbols will be utilized for transmitting demodulation reference signals (DMRS) within each NB-PUSCH subframe. In LTE, PUSCH allocations have a resource granularity of 1 PRB. Therefore, the DMRS base sequences in LTE have been optimized for low cross-correlation when the offset (in frequency domain) between the sequences is an integer number of PRBs, i.e. an integer multiple of 12 subcarriers.

However in case of NB-IOT, it is currently possible to schedule NB-PUSCH resource with a 1-subcarrier granularity, as illustrated in FIG. 12

This implies that the base sequences used for DMRS must have good cross-correlation properties with an offset of 0, 1, 2, . . . , 6 subcarriers. Low correlation for all possible offsets is difficult to achieve in practice, especially for a sufficiently large number of length-6 and length-3 sequences. On the other hand, using base sequences with poor cross-correlation properties will lead to inter-cell interference.

FIG. 12 shows an example NB-PUSCH allocation within a subframe, for multi-tone transmission formats. The offset between NB-PUSCH allocations, and subsequently between the UL DMRS, can be on 1-subcarrier granularity. Additionally, the different NB-PUSCH transmission formats lead to a large number of possible resource allocations. In the most general case, the DCI for scheduling NB-PUSCH can:

Distinguish between 15 kHz and 3.75 kHz numerologies (1 bit) (if this is not signaled in other places such as SIBx.)

In case of 15 kHz, the number of possible NB-PUSCH allocations for 1, 3, 6, and 12-tone formats are 12, 10, 7, and 1 respectively (30 cases requiring 5 bits)

In case of 3.75 kHz, specify one of 48 subcarriers (requiring 6 bits)

Specifying coverage classes with reduced sets of valid transmission formats may be configured by appropriate RRC signalling in an attempt at reducing DCI bits. However, it is desired to further minimize the number of DCI bits that indicate the NB-PUSCH allocation to reduce overhead, especially in case of coverage enhanced operation requiring a large number of repetitions.

Figure 13:
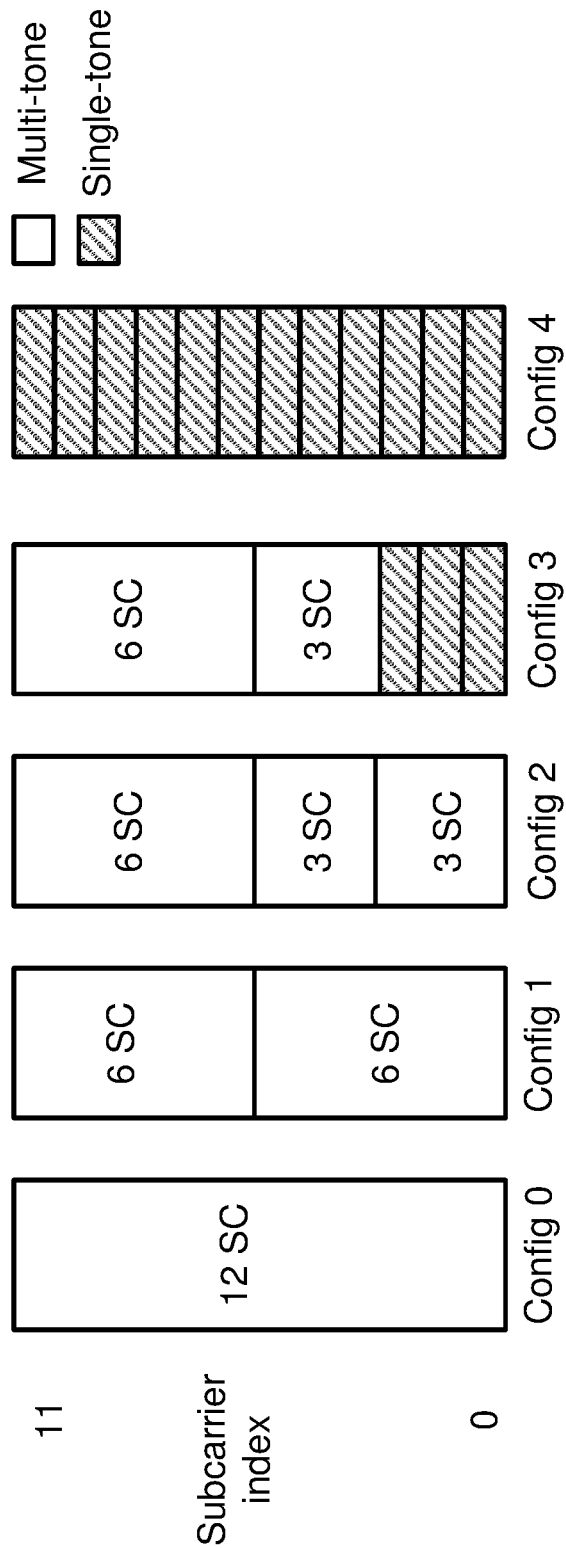
FIG. 13 is a diagram illustrating an example of valid uplink resource configurations for 15 kHz subcarrier spacing.

To resolve the issues discussed above, the uplink NB-IOT resources may be divided in several logical sets of contiguous subcarrier allocations as illustrated in FIG. 13. In general when configured, the 6-tone NB-PUSCH can be scheduled with the smallest subcarrier indices in {0, 6} within the LTE subcarrier, and the 3-tone NB-PUSCH can be scheduled with the smallest subcarrier indices in {0, 3, 6, 9} within the NB-IOT carrier. It is possible to schedule a single-tone NB-PUSCH on any of the NB-IOT subcarriers configured for such single-tone transmissions.

FIG. 13 shows an example of valid NB-PUSCH resource configurations for 15 kHz subcarrier spacing. In a first aspect of the solution herein, a limited number of valid resource allocation configurations are defined at least for multi-tone NB-PUSCH transmission formats. The NB-PUSCH resource configurations specified above enforce that the UL DMRS may be limited to certain possible offsets in the frequency domain, as illustrated in Diagram 4. This ensures that several NB-PUSCH allocations do not overlap in frequency domain, reducing the inter-cell interference. Even when there is an overlap, the offsets between NB-PUSCH allocations is limited to 0, 3, or 6 subcarriers. This makes it possible to specify sufficiently many base sequences with reasonably good cross-correlation properties (for these offset values), and thus reduces inter-cell interference.

Figure 14:
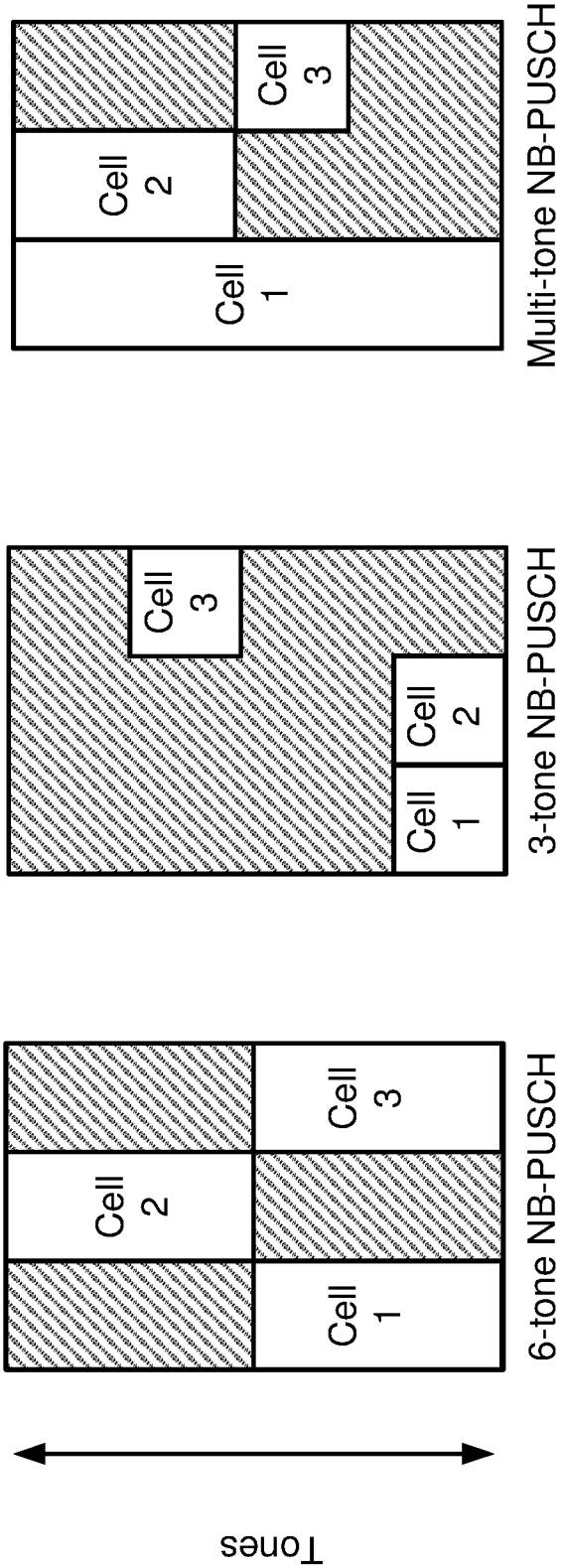
FIG. 14 is a diagram illustrating resource allocation for multi-tone uplink transmission on a shared uplink channel according to one or more embodiments.

FIG. 14 shows a further example of NB-PUSCH allocation within a subframe with proposed configuration scheme. The offset between NB-PUSCH allocations, and subsequently between the UL DMRS, is 0/3/6 subcarriers. Specifying a set of valid NB-PUSCH resource configurations can lead to smaller control signaling overhead for scheduling NB-PUSCH. This is especially important in case of coverage-enhanced UEs that might require several repetitions of the downlink control signal for successful decoding.

One possibility is to dynamically signal the NB-PUSCH resource allocation, with the constraints discussed above (i.e. no explicit signalling of the NB-PUSCH resource configuration). In this case, the total number of valid NB-PUSCH allocations for {12, 6, 3, 1} tone transmission formats and 15 kHz numerology is the sum of 1. One allocation of all 12 tones: {0, 1, 2, 3, 4, 5, 6, 7, 8, 9, 10, 11, 12}
2. Two non-overlapping allocations of 6 tones: {0, 1, 2, 3, 4, 5} and {6, 7, 8, 9, 10, 11}
3. Four non-overlapping allocations of 3 tones: {0, 1, 2}, {3, 4, 5}, {6, 7, 8} and {9, 10, 11}
4. Twelve non-overlapping single-tone allocations: {0}, {1}, {2}, {3}, {4}, {5}, {6}, {7}, {8}, {9}, {10}, {11} and {12},
   i.e. 1+2+4+12=19 different possible allocations, which is significantly smaller than the number of possible allocations in case of scheduling with 1-subcarrier granularity.
   Another possibility is to signal the NB-PUSCH resource configuration semi-statically (e.g. via RRC signalling). For e.g., subcarriers 0-2 and 3-5 may be configured for 3-tone transmissions and subcarriers 6-11 may be configured for 6-tone transmission on a semi-static basis (Config 2 in FIG. 13) In this case, there are only three possible NB-PUSCH frequency resource allocations (two 3-tone allocations and one 6-tone allocation), which can be indicated using only two bits in the DCI.

Figure 15:
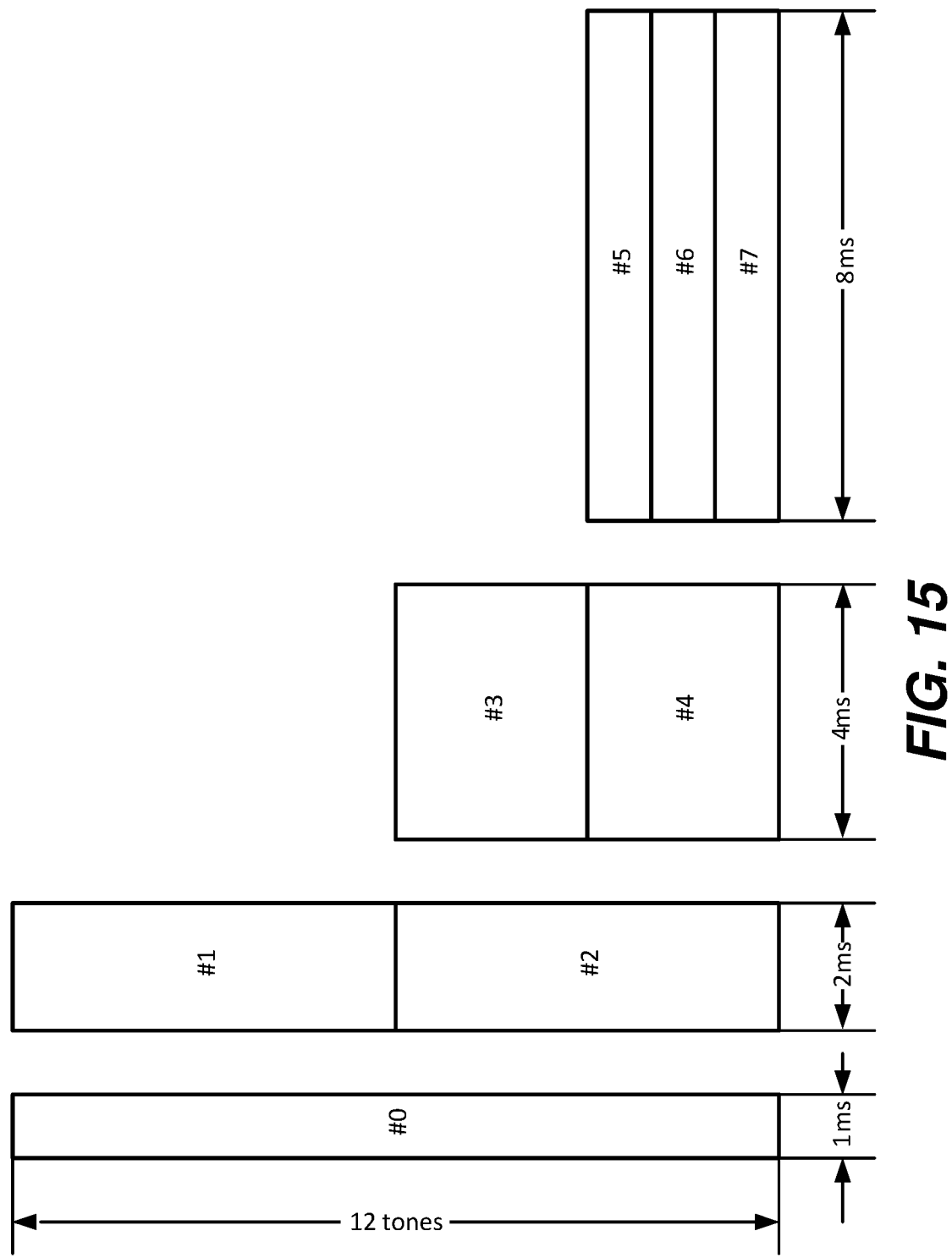
FIG. 15 is a diagram illustrating a further resource allocation for multi-tone uplink transmission on a shared uplink channel according to one or more embodiments.
Figure 16:
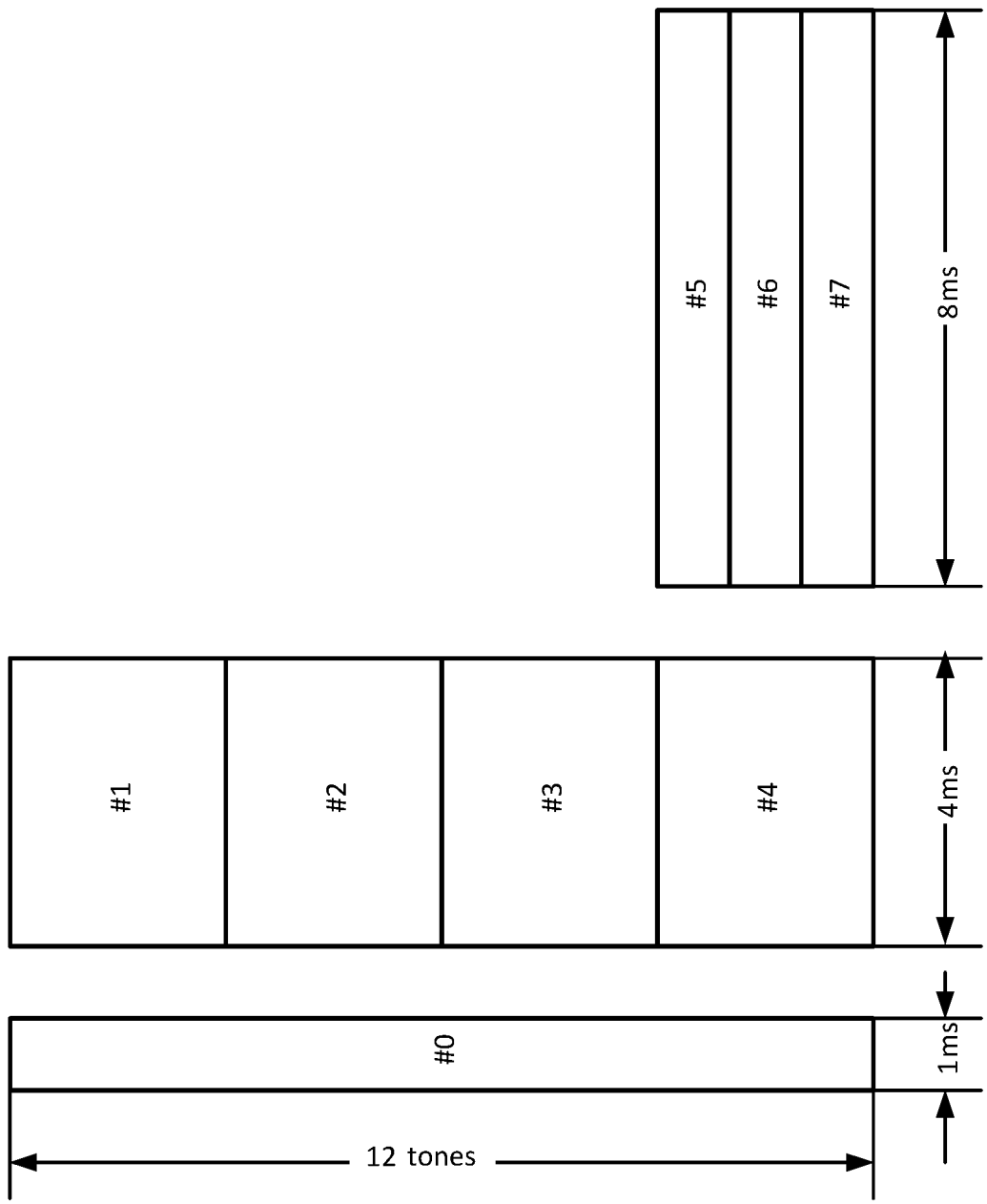
FIG. 16 is a diagram illustrating a further resource allocation for multi-tone uplink transmission on a shared uplink channel according to one or more embodiments.

In another embodiment, the NB-PUSCH resource allocation may use a nested structure. One example of the illustrated resource structure is shown in Table 3. In Table 3, for each NB-PUSCH resource configuration, $B_{NB-PUSCH}$ represents NB-PUSCH-Bandwidth, $m_{NB-PUSCH,i}$ is the number of tones in the resource unit, $N_i$ is the number of resource units of $m_{NB-PUSCH,i}$ tones. For a given each NB-PUSCH resource configuration, summation of the $N_i$, $$\sum_{i=0}^{3} N_i,$$

is the total number of schedule-able resource units. NB-PUSCH resource configuration 0 is illustrated in FIG. 15. NB-PUSCH resource configuration 1 is illustrated in FIG. 16. NB-PUSCH resource configuration can be configured by eNB, for example, via SIB.

Figure 17:
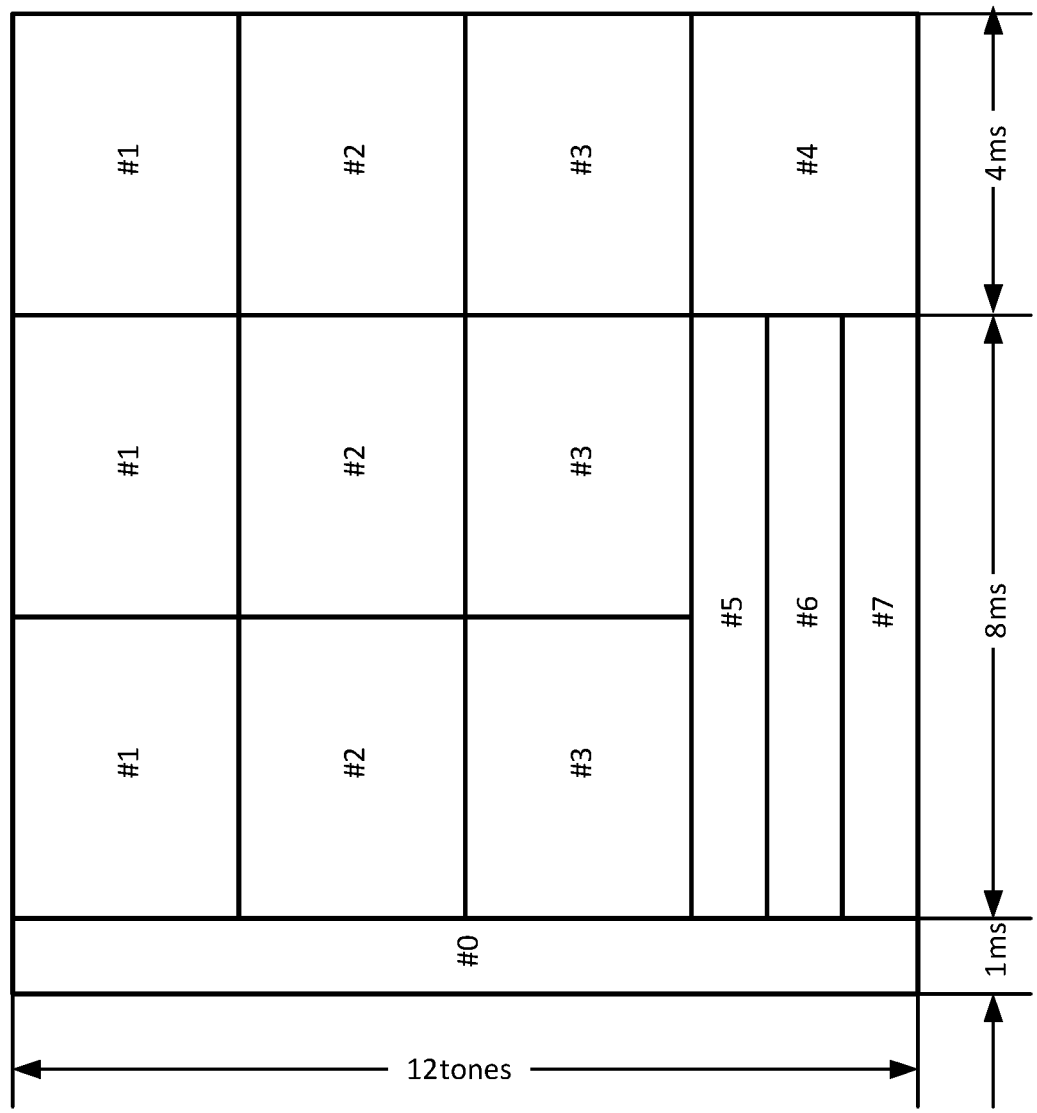
FIG. 17 is a diagram illustrating a further resource allocation for multi-tone uplink transmission on a shared uplink channel according to one or more embodiments.

FIG. 17 illustrates an example of UL resource utilization across 13 ms. The resource indices, #0, #1, #2, . . . , in FIGS. 15-17 can be referred to via a field in the DCI, which schedules a PUSCH transmission.

TABLE 3

NB-PUSCH resource configuration based on 15 kHz subcarrier spacing

| NB-PUSCH resource config. | NB-PUSCH-Bandwidth $B_{NB-PUSCH} = 0$ | | NB-PUSCH-Bandwidth $B_{NB-PUSCH} = 1$ | | NB-PUSCH-Bandwidth $B_{NB-PUSCH} = 2$ | | NB-PUSCH-Bandwidth $B_{NB-PUSCH} = 3$ | |
|---|---|---|---|---|---|---|---|---|
| | $m_{NB-PUSCH,0}$ | $N_0$ | $m_{NB-PUSCH,1}$ | $N_1$ | $m_{NB-PUSCH,2}$ | $N_2$ | $m_{NB-PUSCH,3}$ | $N_3$ |
| 0 | 12 | 1 | 6 | 2 | 3 | 2 | 1 | 3 |
| 1 | 12 | 1 | 3 | 4 | 1 | 3 | — | — |
| 2 | 12 | 1 | 1 | 12 | — | — | — | — |
| 3 | 6 | 2 | 3 | 2 | 1 | 3 | — | — |
| 4 | 3 | 4 | 1 | 3 | — | — | — | — |
| 5 | 1 | 12 | — | 1. — | — | — | — | — |

Figure 18:
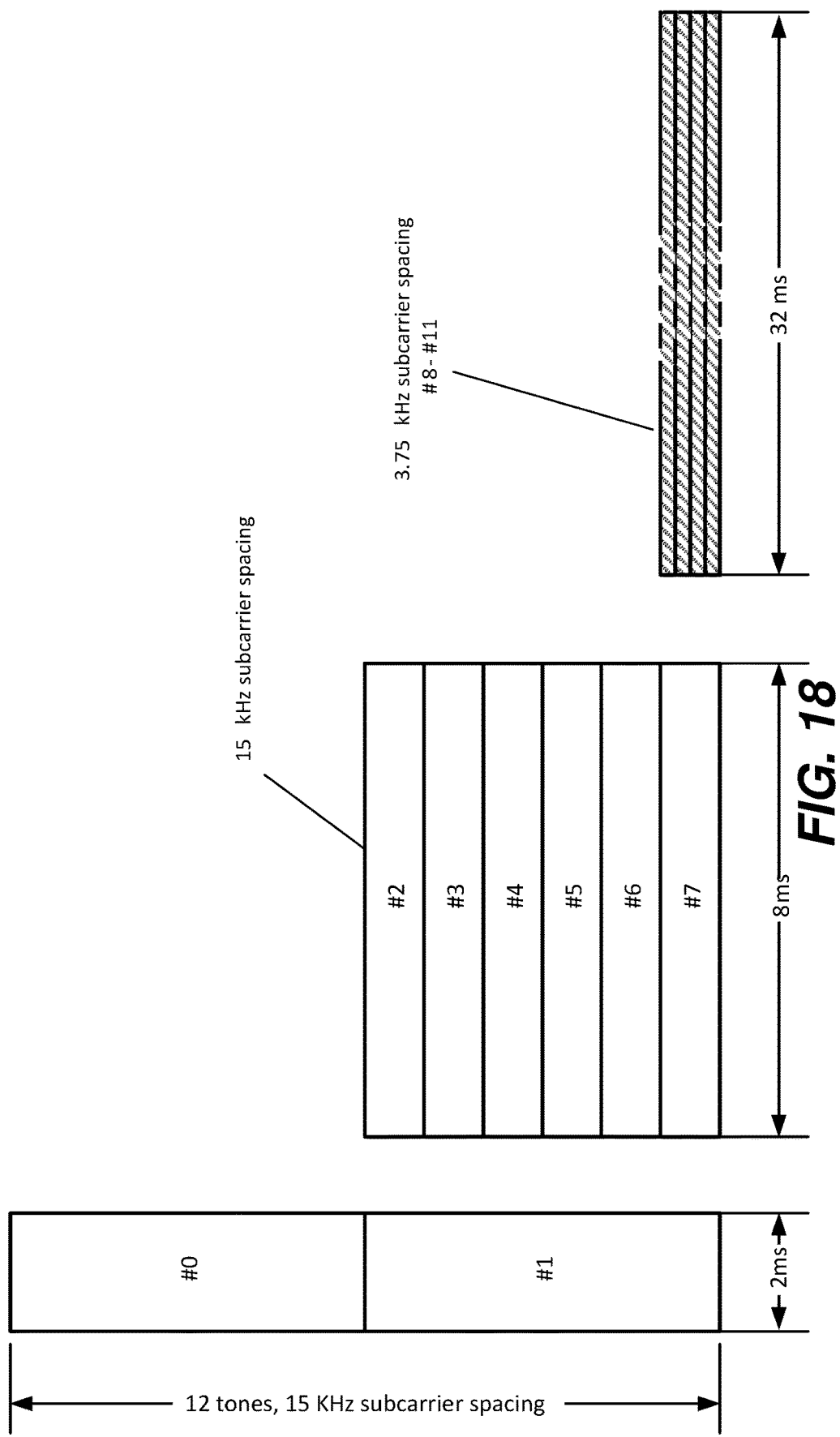
FIG. 18 is a diagram illustrating an example resource configuration for multi-tone uplink transmission on a shared uplink channel according to one or more embodiments.

In another example, a mixture of 15 kHz subcarrier and 3.75 kHz subcarrier can be used. One example of the resource structure is shown in Table 4. In Table 4, Note that NB-PUSCH resource configuration 5 of Table 4 is the special case where only single-tone 3.75 kHz subcarriers are used. For each NB-PUSCH resource configuration, $B_{NB-PUSCH}$ represents NB-PUSCH-Bandwidth, $m_{NB-PUSCH,i}$ is the number of tones in the resource unit together with the subcarrier spacing, N is the number of resource units of $m_{NB-PUSCH,i}$ tones. For a given each NB-PUSCH resource configuration, summation of the $N_i$, $$\sum_{i=0}^{3} N_i,$$

is me total number of schedule-related resource units. NB-PUSCH resource configuration 2 of Table 4 is illustrated in FIG. 18. Similar to the 15 kHz only case, NB-PUSCH resource configuration can be configured by eNB, for example, via SIB.

Figure 19:
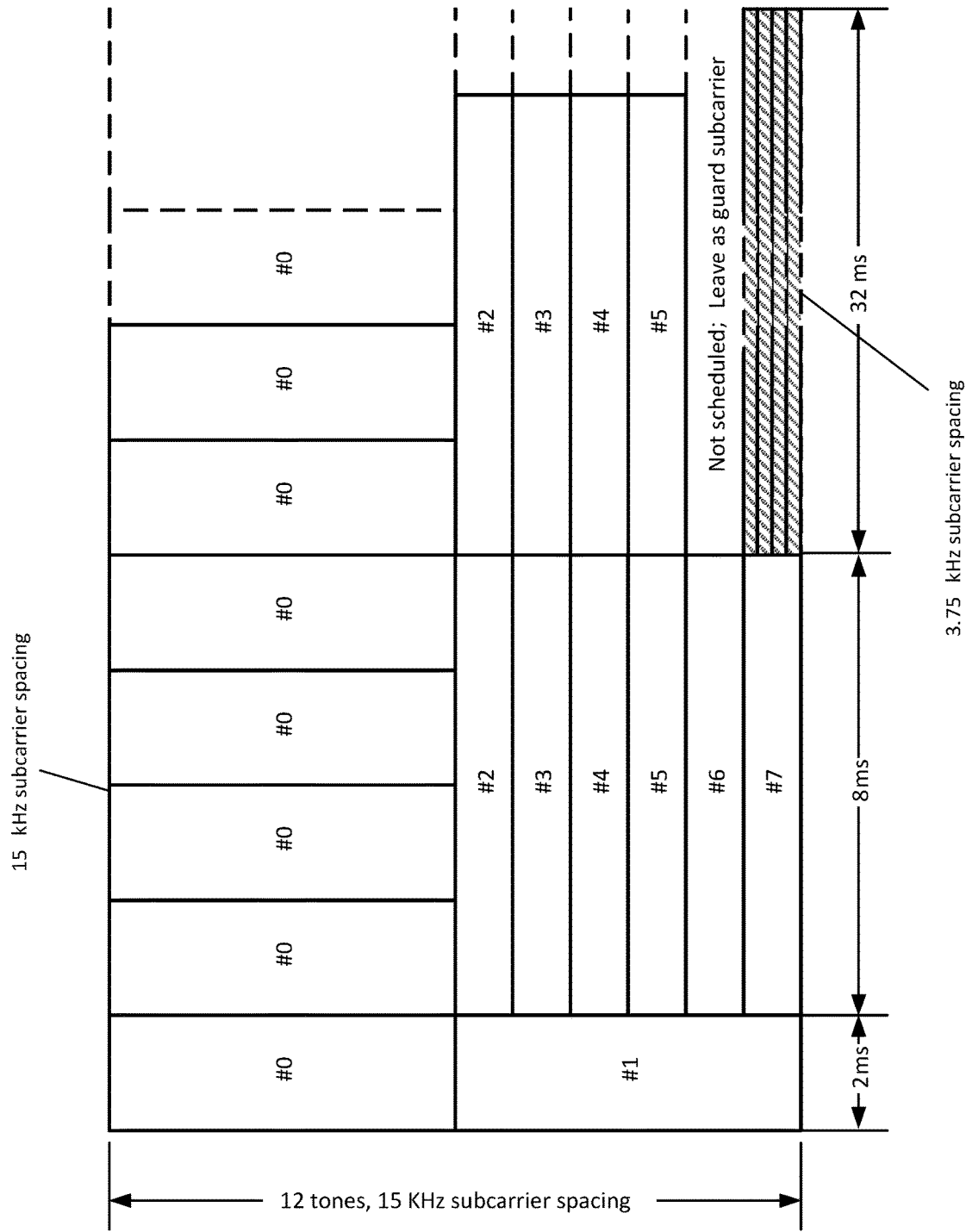
FIG. 19 is a diagram illustrating an example of resource usage for multi-tone uplink transmission on a shared uplink channel according to one or more embodiments.

FIG. 19 illustrates an example of UL resource utilization across 42 ms. The resource indices, #0, #1, #2, . . . , #11 in FIG. 15-18 can be referred to via a field in the DCI, which schedules a PUSCH transmission. Note that, as illustrated in FIG. 19, when 3.75 kHz single-tone is used, one subcarrier (resource unit #6) is left out as guard subcarrier, and should not be used to schedule any PUSCH transmission.

TABLE 4

NB-PUSCH resource configuration based on a mixture of 15 kHz and 3.75 kHz subcarrier spacing

| NB-PUSCH resource configuration | NB-PUSCH-Bandwidth $B_{NB\text{-}PUSCH} = 0$ | | NB-PUSCH-Bandwidth $B_{NB\text{-}PUSCH} = 1$ | | NB-PUSCH-Bandwidth $B_{NB\text{-}PUSCH} = 2$ | | NB-PUSCH-Bandwidth $B_{NB\text{-}PUSCH} = 3$ | |
|---|---|---|---|---|---|---|---|---|
| | $m_{NB\text{-}PUSCH,0}$ | $N_0$ | $m_{NB\text{-}PUSCH,1}$ | $N_1$ | $m_{NB\text{-}PUSCH,2}$ | $N_2$ | $m_{NB\text{-}PUSCH,3}$ | $N_3$ |
| 0 | 12 (15 kHz) | 1 | 6 (15 kHz) | 2 | 3 (15 kHz) | 2 | 1 (3.75 kHz) | 8 |
| 1 | 12 (15 kHz) | 1 | 3 (15 kHz) | 4 | 1 (3.75 kHz) | 8 | — | — |
| 2 | 6 (15 kHz) | 2 | 1 (15 kHz) | 6 | 1 (3.75 kHz) | 4 | — | — |
| 3 | 6 (15 kHz) | 2 | 3 (15 kHz) | 2 | 1 (3.75 kHz) | 8 | — | — |
| 4 | 6 (15 kHz) | 2 | 1 (3.75 kHz) | 20 | — | — | — | — |
| 5 | 1 (3.75 kHz) | 48 | — | — | — | — | — | — |

In some case described above the number of combinations is not a power of two. In this case the representation of the number of combinations using a bit string may result in some potentially unused bit string values in the DCI (e.g. when three possible resource allocations are indicated using two bits in the DCI). In one embodiment these otherwise unused values are used to indicate NB-PUSCH frequency resource allocations outside the UE's default PRB (or 'anchor PRB'), i.e. to indicate allocations in secondary PRBs. This can be useful in an NB-IoT system that makes use of multiple PRBs either for frequency multiplexing different UEs or for serving a UE with a wider channel bandwidth than a single PRB.

The valid NB-PUSCH resource configurations are signaled dynamically (i.e. in the DCI) or semi-statically (e.g. RRC signaling). Accordingly, in the present disclosure, a limited number of valid resource allocation configurations are defined at least for multi-tone NB-PUSCH transmission formats. The valid NB-PUSCH resource configurations are signaled dynamically (i.e. in the DCI) or semi-statically (e.g. RRC signaling).

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a user equipment for performing wireless communication with a base station in a narrowband communication system, the method comprising:
obtaining a first set of multiple indices, each index in the first set of multiple indices corresponding to a different uplink resource allocation from a first set of uplink resource allocations formed from twelve contiguous subcarriers, wherein each of the twelve contiguous subcarriers has a 15 kHz bandwidth
the first set of uplink resource allocations comprising an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers, such that:
the two allocations of six continuous subcarriers do not overlap with each other and fall within a bandwidth of the twelve contiguous subcarriers;
the four allocations of three contiguous subcarriers do not overlap with each other and fall within the bandwidth of the twelve contiguous subcarriers; and
the twelve allocations of single subcarriers do not overlap with each other and fall within the bandwidth of the twelve contiguous subcarriers;
obtaining a second set of multiple indices, each index in the second set of multiple indices corresponding to a different uplink resource allocation from a second set of uplink resource allocations formed from forty-eight contiguous subcarriers, wherein each of the forty-eight contiguous subcarriers has a 3.75 kHz bandwidth;
the second set of uplink resource allocations comprising forty-eight allocations of a single one of the forty-eight contiguous sub-carriers;
receiving signaling distinguishing between 15 kHz and 3.75 kHz subcarrier bandwidth;
receiving, from the base station, an index indication corresponding to an index from the first or second set of multiple indices depending on the received signaling; and
transmitting data to the base station using the resource allocation corresponding to the received index indication.

2. The method of claim 1, wherein the user equipment is preconfigured with the sets of multiple indices, and wherein the user equipment is configured to obtain the sets by reading the preconfigured set of multiple indices.

3. The method of claim 1, wherein the user equipment is configured to transmit the data over a narrowband physical uplink shared channel.

4. The method of claim 1, wherein the received index indication comprises 6 bits.

5. The method of claim 1, wherein the user equipment is configured to receive the index indication in at least one downlink control information message transmitted by the base station.

6. The method of claim 1, wherein the narrowband communication system is a narrowband Internet of Things (NB-IoT) system, or wherein the narrowband communication system is deployed in-band or in a guard band of a Long Term Evolution (LTE) system.

7. The method of claim 6, wherein the narrowband communication system is a narrowband Internet of Things (NB-IoT system; or
wherein the narrowband communication system is deployed in-band or in a guard band of a Long Term Evolution (LTE) system.

8. The method claim 1, wherein a narrowband physical uplink shared channel in the narrowband communication system comprises the set of uplink resource allocations.

9. A method performed by a base station for communication with a user equipment in a narrowband communication system, the method comprising:
  obtaining a first set of multiple indices, each index in the first set of multiple indices corresponding to a different uplink resource allocation from a first set of uplink resource allocations formed from twelve contiguous subcarriers, wherein each of the twelve contiguous subcarriers has a 15 kHz bandwidth
  the first set of uplink resource allocations comprising an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers, such that:
    the two allocations of six continuous subcarriers do not overlap with each other and fall within a bandwidth of the twelve contiguous subcarriers;
    the four allocations of three contiguous subcarriers do not overlap with each other and fall within the bandwidth of the twelve contiguous subcarriers; and
    the twelve allocations of single subcarriers do not overlap with each other and fall within the bandwidth of the twelve contiguous subcarriers;
  obtaining a second set of multiple indices, each index in the second set of multiple indices corresponding to a different uplink resource allocation from a second set of uplink resource allocations formed from forty-eight contiguous subcarriers, wherein each of the forty-eight contiguous subcarriers has a 3.75 kHz bandwidth
  the second set of uplink resource allocations comprising forty-eight allocations of a single one of the forty-eight contiguous sub-carriers;
  transmitting signaling distinguishing between 15 kHz and 3.75 kHz subcarrier bandwidth;
  transmitting, to the user equipment, an index indication corresponding to an index from the first or second set of multiple indices depending on the transmitted signaling; and
  receiving data from the user equipment using the resource allocation corresponding to the transmitted index indication.

10. The method of claim 9, wherein a narrowband physical uplink shared channel in the narrowband communication system comprises the set of uplink resource allocations.

11. A user equipment for communicating with a base station in a narrowband communication system, wherein the user equipment comprises:
  radio circuitry for communicating with the base station; and
  processing circuitry operatively connected to the radio circuitry and configured to cause the user equipment to:
    obtain a first set of multiple indices, each index in the first set of multiple indices corresponding to a different uplink resource allocation from a set of uplink resource allocations formed from twelve contiguous subcarriers, wherein each of the twelve contiguous subcarriers has a 15 kHz bandwidth
    the first set of uplink resource allocations comprising an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers, such that:
      the two allocations of six continuous subcarriers do not overlap with each other and fall within a bandwidth of the twelve contiguous subcarriers;
      the four allocations of three contiguous subcarriers do not overlap with each other and fall within the bandwidth of the twelve contiguous subcarriers; and
      the twelve allocations of single subcarriers do not overlap with each other and fall within the bandwidth of the twelve contiguous subcarriers;
    obtain a second set of multiple indices, each index in the second set of multiple indices corresponding to a different uplink resource allocation from a second set of uplink resource allocations formed from forty-eight contiguous subcarriers, wherein each of the forty-eight contiguous subcarriers has a 3.75 kHz bandwidth;
    the second set of uplink resource allocations comprising forty-eight allocations of a single one of the forty-eight contiguous sub-carriers;
    receive signaling distinguishing between 15 kHz and 3.75 kHz subcarrier bandwidth;
    receive, from the base station, an index indication corresponding to an index from the first or second set of multiple indices dependinq on the received signaling; and
    transmit data to the base station using the resource allocation corresponding to the received index indication.

12. The user equipment of claim 11, wherein the user equipment is preconfigured with the sets of multiple indices, and wherein the user equipment is configured to obtain the sets of multiple indices by reading the preconfigured sets of multiple indices.

13. The user equipment of claim 11, wherein the user equipment is configured to transmit the data over a narrowband physical uplink shared channel.

14. The user equipment of claim 11, wherein the received index indication comprises 6 bits.

15. The user equipment of claim 11, wherein the user equipment is configured to receive the index indication in at least one downlink control information message transmitted by the base station.

16. The user equipment of claim 11, wherein the narrowband communication system is a narrowband Internet of Things (NB-IoT) system, or wherein the narrowband communication system is deployed in-band or in a guard band of a Long Term Evolution (LTE) system.

17. The user equipment of claim 11, wherein a narrowband physical uplink shared channel in the narrowband communication system comprises the set of uplink resource allocations.

18. A base station configured for communication with a user equipment in a narrowband communication system, the base station comprising:
  radio circuitry for communicating with the user equipment; and
  processing circuitry operatively connected to the radio circuitry and configured to:
    obtain a first set of multiple indices, each index in the first set of multiple indices corresponding to a different uplink resource allocation from a first set of uplink resource allocations formed from twelve contiguous subcarriers, wherein each of the twelve contiguous subcarriers has a 15 kHz bandwidth
    the first set of uplink resource allocations comprising an allocation of the twelve contiguous subcarriers, two allocations of six contiguous ones of the twelve contiguous subcarriers, four allocations of three contiguous ones of the twelve contiguous subcarriers, and twelve allocations of a single one of the twelve contiguous subcarriers, such that:
the two allocations of six continuous subcarriers do not overlap with each other and fall within a bandwidth of the twelve contiguous subcarriers;
the four allocations of three contiguous subcarriers do not overlap with each other and fall within the bandwidth of the twelve contiguous subcarriers; and
the twelve allocations of single subcarriers do not overlap with each other and fall within the bandwidth of the twelve contiguous subcarriers;
obtain a second set of multiple indices, each index in the second set of multiple indices corresponding to a different uplink resource allocation from a second set of uplink resource allocations formed from forty-eight contiguous subcarriers, wherein each of the forty-eight contiguous subcarriers has a 3.75 kHz bandwidth;
the second set of uplink resource allocations comprising forty-eight allocations of a single one of the forty-eight contiguous sub-carriers;
transmit signaling distinguishing between 15 kHz and 3.75 kHz subcarrier bandwidth;
transmit, to the user equipment an index indication corresponding to an index from the first or second set of multiple indices to the user equipment depending on the transmitted signaling; and
receive data from the user equipment using the resource allocation corresponding to the transmitted index indication.

19. The base station of claim 18, wherein the narrowband communication system is a narrowband Internet of Things system; or
wherein the narrowband communication system is deployed in-band or in a guard band of a Long Term Evolution (LTE) system.

20. The base station of claim 18, wherein a narrowband physical uplink shared channel in the narrowband communication system comprises the set of uplink resource allocations.

* * * * *

UNITED STATES PATENT AND TRADEMARK OFFICE
CERTIFICATE OF CORRECTION

PATENT NO. : 11,343,820 B2
APPLICATION NO. : 16/935902
DATED : May 24, 2022
INVENTOR(S) : Saxena et al.

It is certified that error appears in the above-identified patent and that said Letters Patent is hereby corrected as shown below:

On the Title Page

On Page 2, in Item (56), under "OTHER PUBLICATIONS", in Column 2, Lines 1-2, delete "Iot (Nb-Iot)"," and insert -- IOT (NB-IOT)", --, therefor.

On Page 2, in Item (56), under "OTHER PUBLICATIONS", in Column 2, Line 7, delete ""Narroband" and insert -- "Narrowband --, therefor.

In the Drawings

In Fig. 8B, Sheet 10 of 21, delete "*FIG. 8b*" and insert -- *FIG. 8B* --, therefor.

In the Specification

In Column 1, Line 9, delete "2018," and insert -- 2018, now U.S. Pat. No. 10,791,555, --, therefor.

In Column 4, Line 21, delete "an narrowband" and insert -- a narrowband --, therefor.

In Column 4, Line 55, delete "using to" and insert -- using --, therefor.

In Column 7, Line 16, delete "information 205 it" and insert -- information 205 --, therefor.

Signed and Sealed this
Twenty-first Day of March, 2023

Katherine Kelly Vidal
*Director of the United States Patent and Trademark Office*

CERTIFICATE OF CORRECTION (continued)
U.S. Pat. No. 11,343,820 B2

In Column 8, Line 43, delete "control information 203" and insert -- control information 205 --, therefor.

In Columns 9 & 10, in Table 2, Line 3, delete "N₃" and insert -- N₂ --, therefor.

In Columns 9 & 10, in Table 2, Line 3, delete "$\overline{m_3}$" and insert -- $\overline{m_3 \quad N_3}$ --, therefor.

In Column 10, Line 1, delete "time as" and insert -- time --, therefor.

In Column 11, Line 54, delete "equipped" and insert -- equipment --, therefor.

In Column 13, Line 22, delete "NO," and insert -- N0, --, therefor.

In Column 14, Line 32, delete "NO," and insert -- N0, --, therefor.

In Column 20, Line 2, delete "time as" and insert -- time --, therefor.

In Column 21, Line 26, delete "guard-band" and insert -- guard-band. --, therefor.

In Column 21, Line 38, delete "size" and insert -- size. --, therefor.

In Column 21, Line 40, delete "size" and insert -- size. --, therefor.

In Column 21, Line 42, delete "size" and insert -- size. --, therefor.

In Column 22, Line 7, delete "FIG. 12" and insert -- FIG. 12. --, therefor.

In Column 22, Line 30, delete "5 bits)" and insert -- 5 bits). --, therefor.

In Column 22, Line 32, delete "6 bits)" and insert -- 6 bits). --, therefor.

In Column 23, Line 17, delete "of" and insert -- of: --, therefor.

In Column 23, Line 56, delete "13)" and insert -- 13). --, therefor.

In Column 24, Line 9, delete "schedule-able" and insert -- scheduleable --, therefor.

In Column 24, Line 45, delete "N" and insert -- $N_i$ --, therefor.

In Column 24, Line 55, delete "me" and insert -- the --, therefor.

In Column 24, Line 55, delete "schedule-related" and insert -- scheduleable --, therefor.

In Column 24, Line 63, delete "FIG. 15-18" and insert -- FIGS. 15-18 --, therefor.

CERTIFICATE OF CORRECTION (continued)
U.S. Pat. No. 11,343,820 B2

In the Claims

In Column 25, Line 57, in Claim 1, delete "bandwidth" and insert -- bandwidth, --, therefor.

In Column 25, Line 65, in Claim 1, delete "continuous subcarriers" and insert -- contiguous subcarriers --, therefor.

In Column 26, Line 61, in Claim 7, delete "(NB-IoT system;" and insert -- (NB-IoT) system; --, therefor.

In Column 26, Line 65, in Claim 8, delete "method claim" and insert -- method of claim --, therefor.

In Column 27, Line 9, in Claim 9, delete "bandwidth" and insert -- bandwidth, --, therefor.

In Column 27, Line 18, in Claim 9, delete "continuous subcarriers" and insert -- contiguous subcarriers --, therefor.

In Column 27, Line 32, in Claim 9, delete "bandwidth" and insert -- bandwidth, --, therefor.

In Column 27, Line 60, in Claim 11, delete "bandwidth" and insert -- bandwidth, --, therefor.

In Column 28, Line 1, in Claim 11, delete "continuous subcarriers" and insert -- contiguous subcarriers --, therefor.

In Column 28, Line 25, in Claim 11, delete "dependinq" and insert -- depending --, therefor.

In Column 28, Line 65, in Claim 18, delete "bandwidth" and insert -- bandwidth, --, therefor.

In Column 29, Line 6, in Claim 18, delete "continuous subcarriers" and insert -- contiguous subcarriers --, therefor.